(12) United States Patent
Santangelo

(10) Patent No.: US 10,877,162 B2
(45) Date of Patent: Dec. 29, 2020

(54) TERRESTRIAL BASED POSITIONING SYSTEMS AND METHODS

(71) Applicant: Skypersonic, LLC, Troy, MI (US)

(72) Inventor: Giuseppe Santangelo, Troy, MI (US)

(73) Assignee: Skypersonic Inc., Troy, MI (US)

( * ) Notice: Subject to any disclaimer, the term of this patent is extended or adjusted under 35 U.S.C. 154(b) by 226 days.

(21) Appl. No.: 15/973,669

(22) Filed: May 8, 2018

(65) Prior Publication Data

US 2018/0329076 A1   Nov. 15, 2018

Related U.S. Application Data

(60) Provisional application No. 62/505,499, filed on May 12, 2017.

(51) Int. Cl.
*G01S 19/48* (2010.01)
*G01S 5/02* (2010.01)
(Continued)

(52) U.S. Cl.
CPC .............. *G01S 19/48* (2013.01); *G01S 1/022* (2013.01); *G01S 1/042* (2013.01); *G01S 1/0428* (2019.08);
(Continued)

(58) Field of Classification Search
CPC .......... G01S 19/48; G01S 19/11; G01S 19/37; G01S 19/21; G01S 1/022; G01S 1/042;
(Continued)

(56) References Cited

U.S. PATENT DOCUMENTS

2007/0217379 A1   9/2007 Fujiwara et al.
2012/0013509 A1*  1/2012 Wisherd .................... G01S 5/06
                                                342/451
(Continued)

FOREIGN PATENT DOCUMENTS

CN         102711247 B    4/2015
EP           1617601 A2   1/2006
(Continued)

OTHER PUBLICATIONS

"Pozyx System," retrieved on Mar. 19, 2018 from https://www.pozyx.io, 6 pages.

(Continued)

*Primary Examiner* — Harry K Liu
(74) *Attorney, Agent, or Firm* — Carlson, Gaskey & Olds, P.C.

(57) ABSTRACT

A terrestrial based positioning system includes a plurality of location anchors configured to transmit and receive ultra-wide band ("UWB") signals. In another aspect, a location tag configured to transmit and receive UWB signals uses signals transmitted by location anchors to determine its current position. In some implementations, a location tag may use Global Positioning System ("GPS") signals or a combination of UWB and GPS signals to determine a current location. The location anchors are organized into zones used by the locations tags to determine a current position based in UWB signals. In some implementations, the locations anchors automatically create the necessary zones. Location anchors may also automatically determine the position of other location anchors. In yet other implementations, the location anchors relay data transmitted by a location tag. In addition, a location anchor may transmit GPS signals that can be used by standard GPS receivers.

20 Claims, 14 Drawing Sheets

(51) Int. Cl.
*G01S 1/02* (2010.01)
*G01S 1/04* (2006.01)
*G01S 19/11* (2010.01)
G01S 5/14 (2006.01)
G01S 1/68 (2006.01)

(52) U.S. Cl.
CPC .......... *G01S 5/0226* (2013.01); *G01S 5/0236* (2013.01); *G01S 5/0289* (2013.01); *G01S 19/11* (2013.01); *G01S 1/68* (2013.01); *G01S 5/14* (2013.01)

(58) Field of Classification Search
CPC .... G01S 5/0226; G01S 5/0236; G01S 5/0289; G01S 5/02
USPC ...................................................... 342/357.48
See application file for complete search history.

(56) References Cited

U.S. PATENT DOCUMENTS

| | | | |
|---|---|---|---|
| 2014/0274130 A1* | 9/2014 | Venkatraman | G01S 19/46 455/456.2 |
| 2016/0137293 A1 | 5/2016 | Santangelo | |
| 2016/0193729 A1* | 7/2016 | Williams | G01S 5/0289 700/258 |
| 2016/0377697 A1 | 12/2016 | Sella | |
| 2017/0276763 A1 | 9/2017 | Howard | |
| 2017/0287335 A1 | 10/2017 | Ansari | |
| 2017/0329351 A1 | 11/2017 | Park et al. | |
| 2017/0367766 A1* | 12/2017 | Mahfouz | A61B 17/1703 |

FOREIGN PATENT DOCUMENTS

| | | | |
|---|---|---|---|
| EP | 1821116 A1 | 8/2007 | |
| EP | 1617601 A3 | 9/2010 | |
| EP | 2549286 A1 | 1/2013 | |
| KR | 2017085385 A * | 1/2016 | ........... B64C 39/024 |

OTHER PUBLICATIONS

"Pozyx Pin-out," retrieved on Mar. 20, 2018 from https://www.pozyx.io/Documentation/Datasheet/pinOut, 4 pages.
"Pozyx Functional Description," retrieved on Mar. 20, 2018 from https://www.pozyx.io/Documentation/Datasheet/FunctionalDescription, 5 pages.
"Pozyx System Description," retrieved on Mar. 20, 2018 from https://www.pozyx.io/Documentation/Datasheet/SystemDescription, 2 pages.
"Pozyx System Performance," retrieved on Mar. 20, 2018 from https://www.pozyx.io/Documentation/Datasheet/SystemPerformance, 9 pages.
"Pozyx Register Overview," retrieved on Mar. 20, 2018 from https://www.pozyx.io/Documentation/Datasheet/RegisterOverview, 12 pages.
"Pozyx Interfaces," retrieved on Mar. 20, 2018 from https://www.pozyx.io/Documentation/Datasheet/Interfaces, 6 pages.
"Skyloc Tracker," retrieved on May 8, 2018 from https://play.google.com/store/apps/details?id=marco.firstapp, 3 pages.
Skycopter photographs, offered for sale prior to 2018.
"Skyloc," Skypersonic, published before Apr. 2018, 5 pages.

* cited by examiner

TERRESTRIAL BASED POSITIONING SYSTEMS AND METHODS

CROSS-REFERENCE TO RELATED APPLICATIONS

This application claims the benefit of U.S. Provisional Application No. 62/505,499, filed May 12, 2017. The entire disclosure of the application referenced above is incorporated by reference.

FIELD

The present disclosure relates to terrestrial based real-time positioning and more particularly to ultra-wide band based positioning.

BACKGROUND

Currently systems and methods exist that use systems of satellites to determine the position of objects on or near the Earth's surface. An example of such a system is the Global Positioning System ("GPS"). Although these system are able to provide accurate positions, they require a clear view of the open sky. Objects that have an obstructed view of the sky are not able to receive the signals broadcast by the system of satellites and, therefore, are not able to accurately determine, if at all, their current position.

FIG. 1 depicts an example scenario of an object receiving signals from satellites orbiting the Earth. In FIG. 1, the object is an unmanned autonomous vehicle ("UAV") 104—specifically, an aerial drone. The satellites are GPS satellites 108 and 110. The UAV determines its current position based on the signals received from the GPS satellites 108 and 110. Although only two satellites are shown in FIG. 1, the UAV 104 may receive signals from more than two satellites. For example, the UAV 104 may receive signals from three or more satellites. The greater the number of satellites that a signal is received from, the greater the accuracy of the determined position.

As the UAV 104 moves, signals from the GPS satellites 108 and 110 may be obstructed. As an example, in FIG. 1 as the UAV 104 travels under a bridge 120, the bridge 120 may block the signals from the GPS satellites 108 and 110 from reaching the UAV 104. In such circumstances, the UAV 104 may be unable to determine its current position. This may negatively affect the ability of the UAV 104 to navigate autonomously. There exists a need for systems and methods for accurately determining the position of an object when signals from GPS satellites are unavailable.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with the present disclosure, a terrestrial based positioning system includes a plurality of location anchors configured to transmit and receive ultra-wide band ("UWB") signals. In another aspect, a location tag configured to transmit and receive UWB signals uses signals transmitted by location anchors to determine its current position. In some implementations, a location tag may use GPS signals or a combination of UWB and GPS signals to determine a current location. The location anchors are organized into zones used by the locations tags to determine a current position based in UWB signals. In some implementations, the locations anchors automatically create the necessary zones. Location anchors may also automatically determine the position of other location anchors. In yet other implementations, the location anchors relay data transmitted by a location tag. In addition, a location anchor may transmit GPS signals that can be used by standard GPS receivers.

The present terrestrial based positioning system is advantageous over other positioning system. For example, a location tag of the present system is able to determine its current location even when location tag is not able to receive GPS signals. Further, location anchors can automatically create the zones required to determine a position based on UWB signals. Autonomous vehicle can use a location tag to navigate in locations where a current position is not able to be determined based on GPS signals, for example in tunnels, parking structures, and other buildings, under bridges, or in confined spaces—such as pipelines. In addition, the relaying of data by the location anchors increases the effective transmission range of a location tag that uses UWB signals to transmit data.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

According to the present disclosure, a location tag may use ultra-wide band ("UWB") signals to determine a current location. The location tag receives the UWB signals from a plurality of location anchors. The location anchors may be placed in locations where other types of positioning systems, such as global positioning system ("GPS"), are ineffective. For example, the location anchors may be placed inside or near structures that prevent the reception of GPS signals transmitted from GPS satellites—such as overpasses, tunnels, and buildings.

Figure 2:
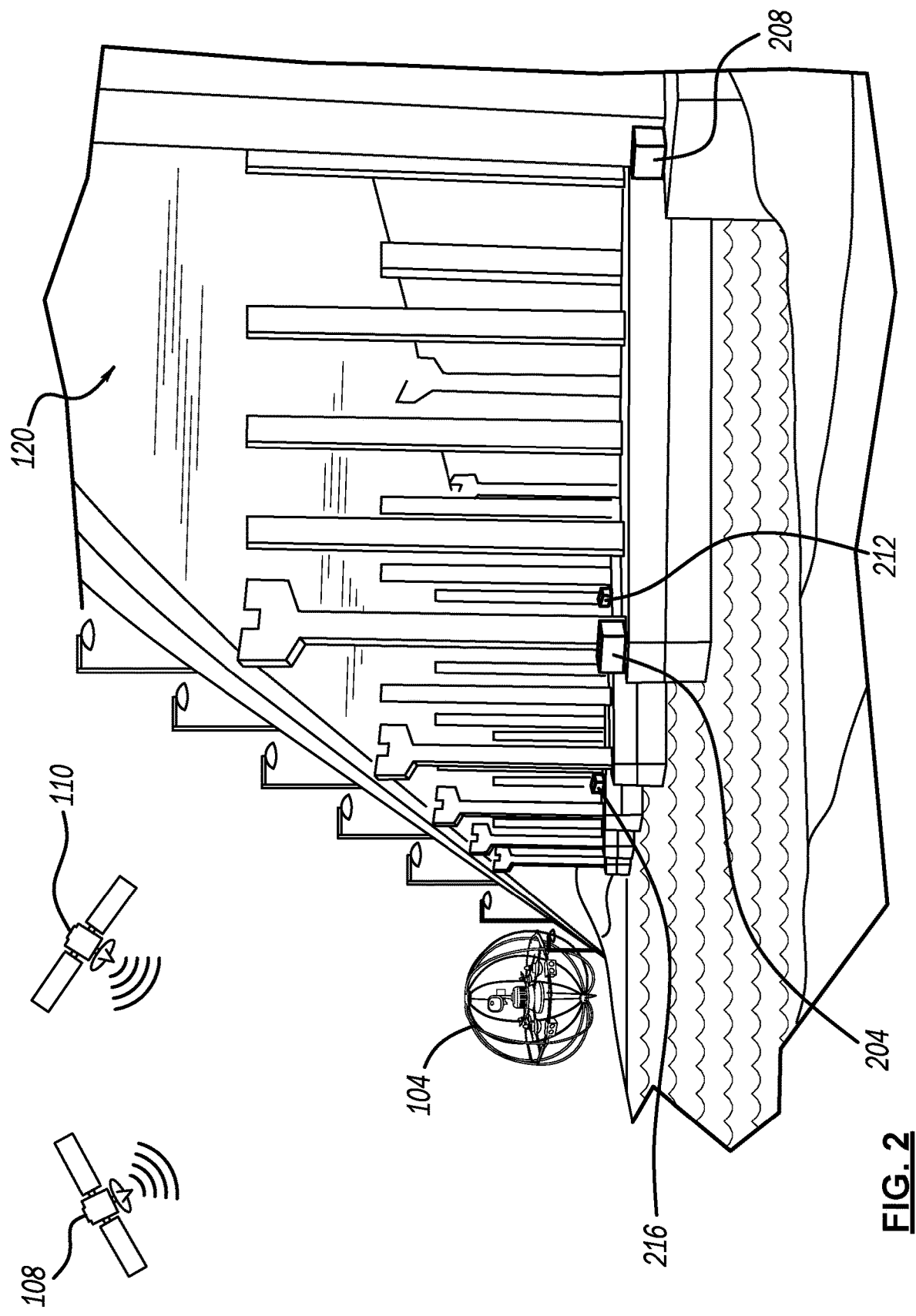
FIG. 2 depicts a UAV using a terrestrial based positioning system to navigate.

FIG. 2 is an example of a plurality of location anchors 204-216 providing UWB signals to the UAV 104 in a location where the UAV 104 is not able to obtain a position based on GPS signals—for example, under the bridge 120. The UAV 104 includes a location tag that receives the UWB signals transmitted by the plurality of location anchors 204-216. The location tag of the UAV 104 uses the received UWB signals to determine the current position of the UAV 104. Since the position of the UAV 104 is determined based on UWB signals, the UAV 104 may be able to autonomously navigate in areas where the UAV 104 is not able to receive GPS signals, such as under the bridge 120. Although FIG. 2 depicts an aerial drone, any vehicle or object that is capable of receiving UWB signals from the location anchors 204-216 may use the principals of the present disclosure to determine a current position.

The plurality of location anchors may automatically determine the position of each location anchor. In other implementations, the location of each location anchor may be determined, for example, by an operator and then provided to the anchors. The locations anchors may also broadcast UWB signals that include the position of each location anchor. The location tag may use the broadcasted information to determine relative distances to three of more location anchors. Based on the determined distances and the positions of the three or more location anchors, the location tag determines its current position. For example, the location tag may use trilateration or multilateration to determine the current position. In some implementations, vehicles equipped with a location tags may use the determined positions to navigate autonomously. For example, the vehicles may be able to autonomously operate inside a parking structure or other building.

Additionally or alternatively, the location tag may use GPS signals to determine a current position. In some implementations, the location anchor may use both GPS signals and UWB signals to determine a current position. The location tag may also be configured to provide the determined position to a location device, such as a navigation system located in a vehicle. In other implementations, a location anchor may be configured to transmit GPS signals that may be received and used by standard GPS receivers.

Figure 3:
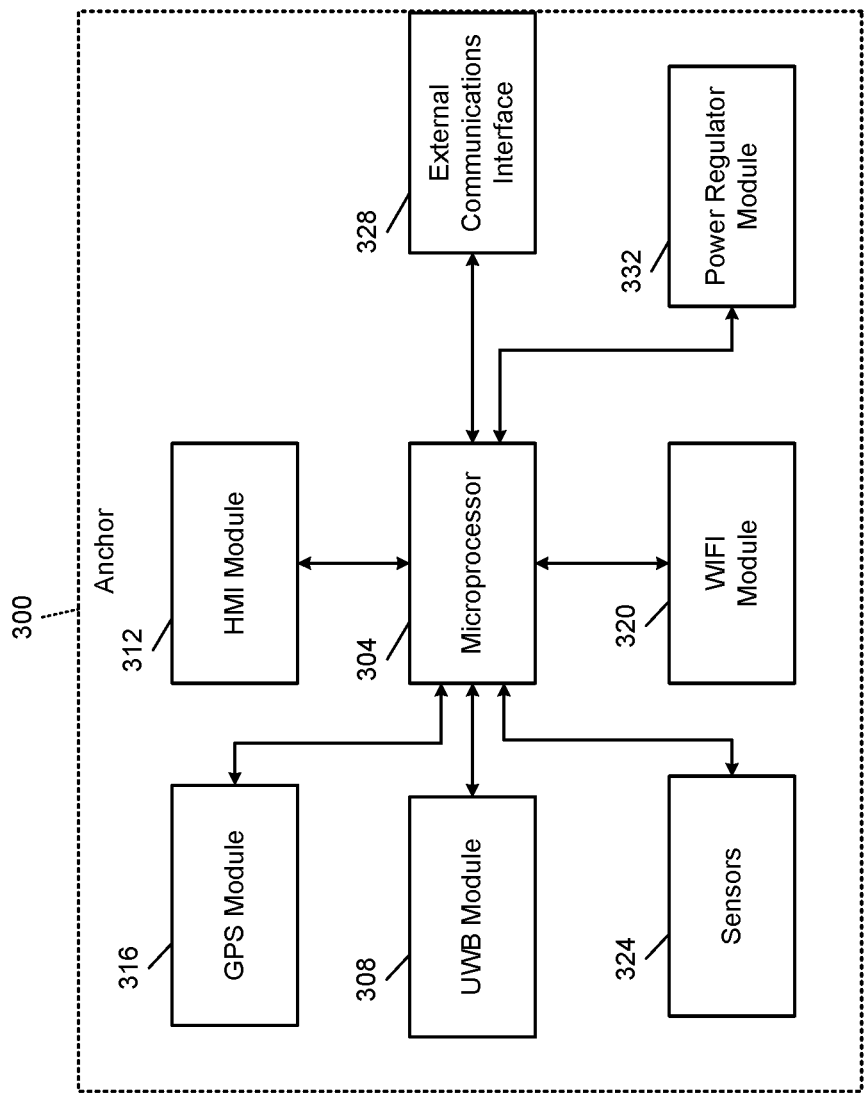
FIG. 3 is a block diagram of an example location anchor that uses ultra-wide band ("UWB") signals to provide location services according to the principles of the present disclosure.

FIG. 3 is a high level block diagram of an example location anchor, anchor 300. The anchor 300 includes a microprocessor 304. The microprocessor 304 includes a processor and associated memory that stores instruction executable by the processor. The anchor 300 also includes an UWB module 308. The UWB module 308 may include an UWB transmitter, an UWB receiver, or a combination transmitter and receiver, such as an UWB transceiver. The UWB module 308 is configured to broadcast information associated with the anchor 300—such as the position of the anchor 300. The UWB module 308 is also configured to receive information transmitted by other location anchors or a location tag. For example, the UWB module 308 may be used to determine the distance to and/or position of other location anchors based on received signals broadcasted by other location anchors. The anchor 300 also includes a human machine interface ("HMI") module 312. The HMI module 312 provides basic input and output functions for the anchor 300. For example, the HMI module 312 may include light emitting diodes ("LEDs") to present visual information to an operator. In addition, the HMI module 312 may include buttons and/or switches. The operator may use the buttons and/or switches to input information into the anchor 300.

In some implementations, the anchor 300 may include a GPS module 316. The GPS module is configured to receive GPS signals—for example, from GPS satellites. The anchor 300 uses the received GPS signals to determine the location of the anchor 300. The GPS module 316 may calculate the position of the anchor 300 based on the received signals and provide the calculated position to the microprocessor 304. Alternatively, the GPS module 316 may provide the data included in the received signals to the microprocessor 304 and the microprocessor 304 determines the position based on the provided data. The GPS module 316 may include an antenna configured to receive the GPS signals. Alternatively or in addition, the GPS module may use an antenna external to the anchor 300 to receive the signals.

The anchor may also include a WIFI module 320 configured to provide WIFI communications. For example, the anchor 300 may use the WIFI module 320 to communicate with other location anchors or another WIFI enabled device. In addition, the anchor 300 may include one or more sensors collectively referred to as sensors 324. The sensors 324 may include an inertial measurement unit ("IMU") that includes at least one of an accelerometer, a gyroscope, and a magnetometer. In various implementations, the sensors 324 may include navigation sensors such as sonar, infrared, distance, and pressure sensors. Additionally or alternatively, the sensors 324 may include environmental sensors such as temperature, humidity, and chemical sensors.

The anchor 300 also includes an external communications interface 328 configured to provide wired connectivity to an external computing device. For example, the external communications interface 328 may be a universal serial bus ("USB") interface. The anchor 300 also includes a power regulator module 332 configured to supply the microprocessor 304, the UWB module 308, the HMI module 312, the GPS module 316, the WIFI module 320, and sensors 324 with a steady voltage—for example, 5 volts. The power regulator module 332 may receive power from a battery (not shown). In some implementations, the battery may be located externally from the anchor 300. In other implementations, the anchor 300 may include the battery. The power regulator module 332 is also configured to receive power via the external communications interface or a power port (not shown). In some implementations, the battery may be a rechargeable battery and the power regulator module 332 may be configured to recharge the battery using the power supplied by the external communications interface or the power port.

Figure 4:
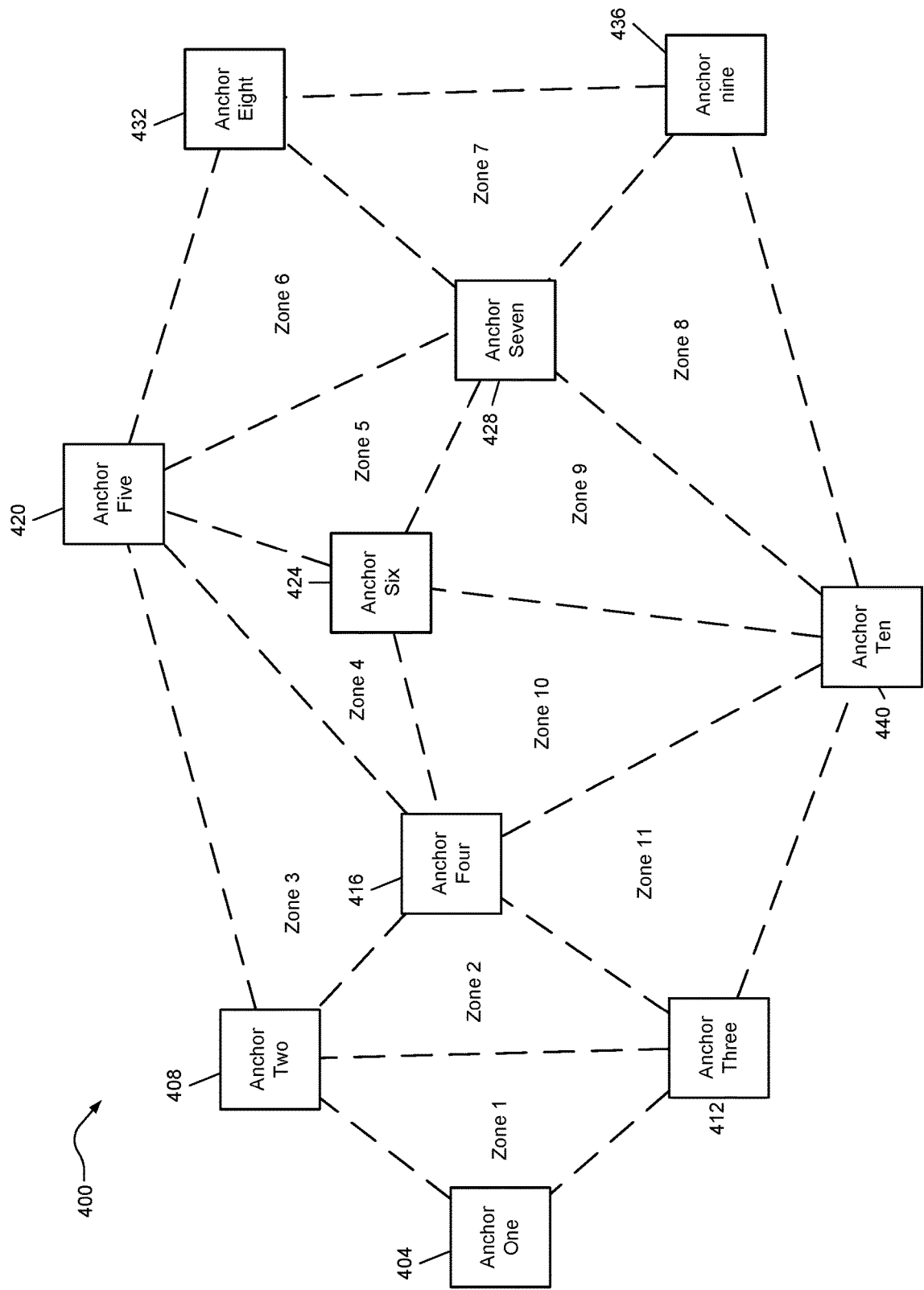
FIG. 4 is an example configuration of location anchors used to create zones consisting of three location anchors according to the principles of the present disclosure.

FIG. 4 shows an example configuration 400 of a plurality of location anchors. Each anchor of the plurality of location anchors may be a location anchor such as anchor 300. Further, each location anchor has a unique identification ("ID"). In FIG. 4, the plurality of location anchors includes anchor one 404, anchor two 408, anchor three 412, anchor four 416, anchor five 420, anchor six 424, anchor seven 428, anchor eight 432, anchor nine 436, and anchor ten 440. The plurality of anchors are configured into eleven zones. In FIG. 4, the zones are represented by dashed lines and are uniquely labeled. Each zone consists of three anchors: a base anchor and two additional anchors. For example, anchor one 404, anchor two 408, and anchor three form Zone 1. Anchor one 404 is the base anchor of Zone 1. Each base anchor communicates with neighboring location anchors to form a zone. The base anchor stores all of the information associated with a zone including the identification and position of each location anchor in the zone. The base anchor also broadcasts the information associated with the zone. A zone may only have one base anchor. Although any location anchor may be a base anchor, a location anchor may only be a base anchor for a single zone. However, a base anchor may be included in other zones, as long another anchor is the base anchor for the zone. For example, anchor two 408 may be the base anchor for Zone 2 that consists of anchor two 408, anchor three 412, and anchor four 416, even though anchor two 408 is also included in Zone 1.

The plurality of location anchors depicted in FIG. 4 may each be placed in a specific location with a known position. In such implementations, the zones and base anchors may be predetermined. Each anchor may be provided with its position and each base anchor may be provided with all of the information associated with the respective zone. In some implementations, each anchor of the plurality of anchors may be located in the same plane. In other words, all of the anchors are coplanar. In other implementations, the plurality of location anchors may be randomly distributed on a flat surface—for example, a floor of a building or a flat sports field such as a soccer pitch. As an example, each location anchor may be housed in a polyhedral enclosure. In some implementations, the enclosure is a decahedron. The enclosure allows the location anchor to be rolled across a surface—for example, by being tossed—and then come to rest on one of the flat surfaces of the enclosure. Each location anchor may use an accelerometer to determine when the location anchor has come to a rest. When the anchors are randomly districted, the location of each anchor may not be known and the zones are not predefined.

Figure 5:
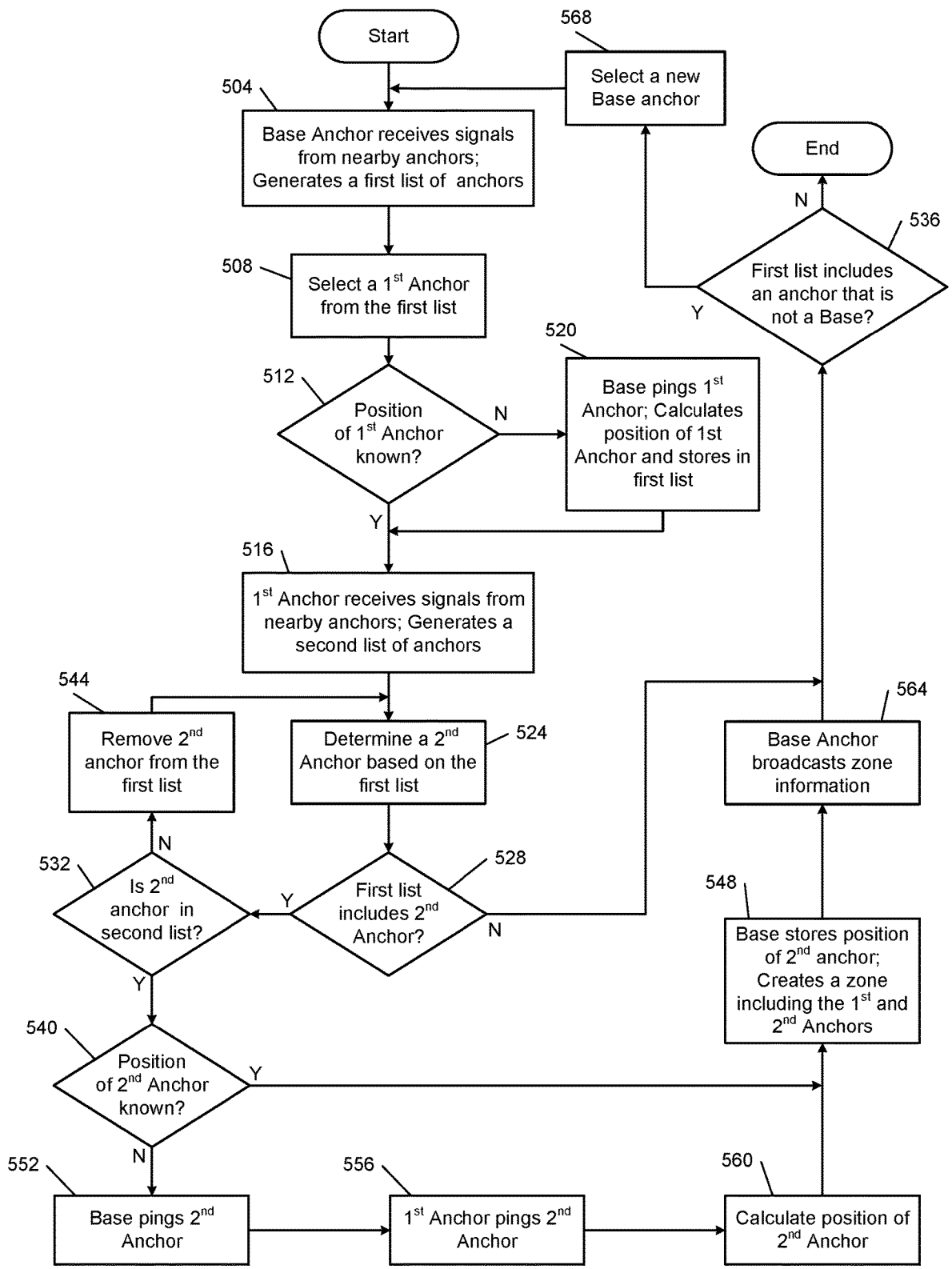
FIG. 5 is a flowchart of example operation of auto calibration of a collection of location anchors to create zones that consist of three location anchors.

FIG. 5 is a flowchart depicting an example method of automatically creating a plurality of zones for a plurality of coplanar location anchors—for example, location anchors randomly distributed across a flat surface. The process requires that the position of at least one anchor of the plurality of anchors is known. One of the location anchors may be able to receive signals from GPS satellites and determine its position based on the received signals. Alternatively, an operator may determine the position of a location anchor and provide the position to the anchor. This anchor will be the initial base anchor. In addition, at least two location anchors near the base anchor must either have a known position or the angular distance between the base anchor and the neighboring location anchors must be known. The position of the neighboring location anchors or the angular distance may be determined by an operator and provided to the neighboring location anchors. Alternatively or in addition, the neighboring location anchors may receive GPS signals to determine their current position. With reference to FIG. 4, the position of anchor one 404 is known and is the initial base anchor. Further, either the positions or angular distances of neighboring location anchors—such as anchor two 408 and anchor three 412—are initially known. In FIG. 5 control is performed by the plurality of location anchors.

Control begins at 504 of FIG. 5 once all of the location anchors have come to a rest and the above required information is obtained. At 504, a base anchor—such as anchor one 404—receives UWB signals from nearby location anchors and generates a first list of location anchors based on the received signals. For example, anchor one 404 may receive signals from anchor two 408, anchor three 412, and anchor four 416 and generates a list that includes these location anchors. The base anchor includes the ID and position, if known, of each location anchor that a signal is received from. Control progresses to 508, where the base anchor selects a first anchor for the zone from the first list. The base anchor selects either a location anchor with a known position or a known angular distance as the first anchor. If more than one location anchor has a known position or angular distance, the base anchor selects the location anchor with the best signal. The base anchor determines the quality of the received signals based on both the strength of the signal and the stability of the signal. For example, anchor one 404 may select anchor two 408 as the first anchor because the signal received from anchor two 408 was stronger and more stable than the signal received from anchor three 412. Control then continues with 512.

At 512, the base anchor determines whether the position of the selected first anchor is known. If so, control progresses to 516; otherwise control determines that only the angular distance of the selected first anchor is known and control transfers to 520. At 520, the base anchor pings the selected first anchor. In response to being pinged, the selected first anchor immediately replies by pinging the base anchor. The base anchor determines the length of time between pinging the selected first anchor and receiving a ping from the selected first anchor. The base anchor uses the elapsed time to determine the distance to the selected first anchor—for example, the distance between anchor one 404 and anchor two 408. In various implementations, the base anchor may calculate the distance as half of the product of the speed of light and the elapsed time. Then the base anchor uses its position, the angular distance to the selected first anchor, and the determined distance to the selected first anchor to calculate the position of the first anchor. The base anchor then stores the position of the first anchor in the first list. The base anchor may also transmit the calculated position to the first anchor. Upon receiving the calculated position, the first anchor stores the position as its current position. Control then continues with 516.

At 516, the first anchor receives UWB signals from nearby anchors and generates a second list of location anchors. The first anchor includes the ID and position, if known, of each anchor that a signal is received from in the second list. For example, in response to anchor two 408 receiving an instruction from anchor one 404, anchor two 408 receives signals from anchor one 404, anchor three 412, anchor four 416, anchor five 420, and anchor six 424 and generates a list that includes these location anchors. Control then continues with 524, where the base anchor selects a second anchor from the first list of location anchors. The base anchor selects the location anchor with the best signal, other than the first anchor, as the second anchor. The base also gives priority to location anchors with either a known position or angular distance. For example, anchor one 404 selects anchor three 412 as the second anchor. At 528, if the first list includes an anchor that the base anchor is able to select as the second anchor, control progresses to 532; otherwise, control transfers to 536, as described below.

At 532, the base anchor determines if the selected second anchor is included in the second list. In other words, the base anchor determines if the first anchor is able to receive UWB signals transmitted by the selected second anchor. For example, anchor one 404 may query anchor two 408 with the ID of anchor three 412 and anchor two 408 responds by indicating whether the second list includes the ID of anchor three 412. If the second list includes the selected second anchor, control progresses to 540; otherwise, control transfers to 544. At 544, the base anchor removes the selected second anchor from the first list and control returns to 524.

At 540, the base anchor determines whether the position of the selected second anchor is known. If so, control progresses to 548; otherwise control transfers to 552. At 552, the base anchor pings the selected second anchor and receives a ping from the selected second anchor in response. Based on the time between pings, the base anchor determines the distance between the base anchor and the second anchor. For example, anchor one 404 pings anchor three 412 and, in response, anchor three 412 pings anchor one 404. Then, anchor one 404 determines the distance between anchor one 404 and anchor three 412. Control then continues with 556. At 556, the base anchor instructs the first anchor to determine the distance between the first anchor and the second anchor. In response, the first anchor pings the second anchor and calculates the distance between the first anchor and the second anchor. The first anchor then transmits the calculated distance to the base anchor. For example, anchor one 404 may instruct anchor two 404 to: ping anchor three 412, determine the distance between anchor two 408 and anchor three 412, and transmit the determined distance to anchor one 404. Control then continues with 560.

At 560, the base anchor calculates the position of the selected second anchor based on the calculated and received distances—for example, using trilateration. Based on the two determined distances, the base anchor may determine two possible positions of the second anchor. To determine which position of the two possible positions is the correct position, the base anchor may instruct a nearby anchor with a known position, other than the first anchor, to ping the second anchor, determine the distance to the second anchor, and transmit the distance to the base anchor. The base anchor uses the known position of the nearby anchor and the received distance to determine which of the two possible positions is the correct position of the second anchor. The base anchor may use zone information broadcast by neighboring base anchors to select the nearby anchor. Alternatively, if the angular distance of the second anchor is known, control may progresses directly from 552 to 560, where the base anchor determines the position of the second anchor based on the distance between the base anchor and the second anchor and the angular distance of the second anchor. Control then continues with 548.

At 548, the base anchor stores the position of the selected second anchor in the first list of location anchors. The base anchor may also transmit the calculated position to the selected second anchors. The base anchor then creates a zone that includes the base anchor, the selected first anchor, and the selected second anchor. For example, anchor one 404 creates Zone 1 that includes anchor one 404, anchor two 408, and anchor three 412, where anchor one 404 is the base anchor of Zone 1. Control progresses to 564, where the base anchor begins broadcasting information about the created zone. The broadcast may include the ID of the base anchor of the zone, the ID of each of the other anchors in the zone, and the position of each anchor in the zone. Control then continues with 536.

At 536, the base anchor determines whether the first list of location anchors includes a location anchor that is not a base anchor. If so, control progresses to 568; otherwise control ends. At 568, the current base anchor selects an anchor from the first list of anchors to be a base anchor of a new zone. In various implementations, the base anchor gives priority to the selected first anchor and the selected second anchor. In other words, if the first anchor is not already a base for a zone, the base anchor selects the first anchor as the new base anchor. If the first anchor is already a base anchor for a zone, the base anchor selects the second anchor as the new base anchor, if the second base anchor is not already a base of a zone. If both the first and second anchors are base anchors, the base anchor selects another anchor in the first list that has a known position as the new base anchor. For example, anchor one 404 selects anchor two 408 to be the base anchor of a new zone—such as Zone 2. In other implementations, the base anchors give priority to location anchors that receive signals from the highest number of neighboring location anchors. Control then returns to 504, where the new base anchor repeats the process to create a new zone. The process continues and new zones are created until a new base anchor is not able to be selected. Although the above process has been described with respect to a plurality of location anchors without any preexisting zones, the process may also be used to add new location anchors and zones to a plurality of location anchors with existing zones.

Figure 6:
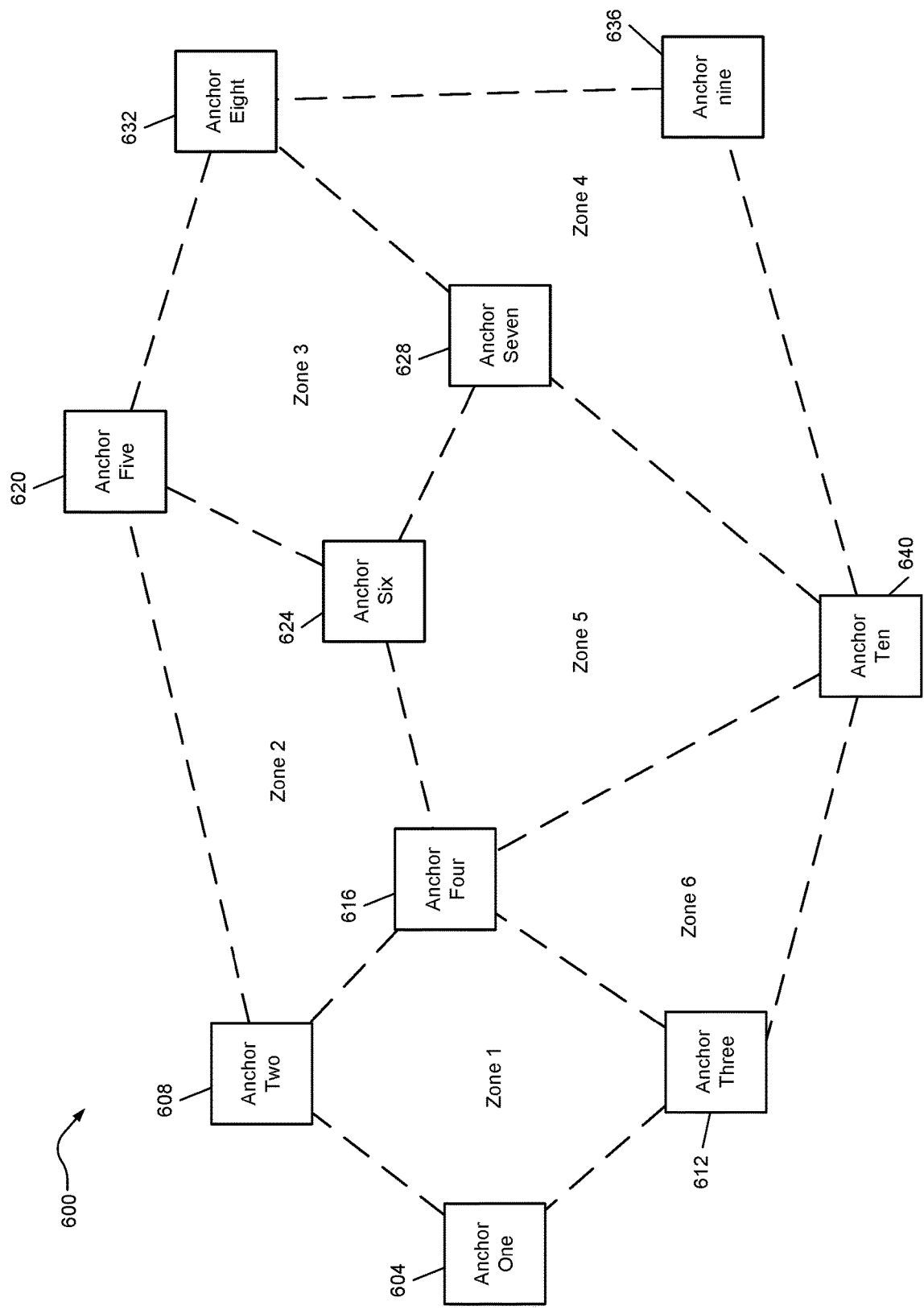
FIG. 6 is an example configuration of location anchors used to create zones consisting of three or more location anchors according to the principles of the present disclosure.

FIG. 6 depicts another configuration 600 of a plurality of location anchors. Each location anchor of the plurality of location anchors may be a location anchor such as anchor 300. In FIG. 6, the plurality of location anchors includes anchor one 604, anchor two 608, anchor three 612, anchor four 616, anchor five 620, anchor six 624, anchor seven 628, anchor eight 632, anchor nine 636, and anchor ten 640. In FIG. 6, the plurality of anchors are configured into six zones represented by dashed lines. Each zone consists of either three or four anchors: a base anchor and two or three additional anchors. For example, anchor one 604, anchor two 608, anchor three 612, and anchor four 616 form Zone 1. Anchor one 604 is the base anchor of Zone 1. Similar to the configuration 400 described above, the base anchor stores all of the information associated with the zone including the ID and position of each anchor that makes up the zone. The base anchor broadcasts the information associated with the zone. As previously disclosed, a zone may only have one base anchor. Although any location anchor may be a base anchor, a location anchor may only be a base anchor for a single zone. However, a base anchor may be included in other zones, as long another location anchor is the base anchor for the zone.

Whereas the configuration 400 included a plurality of coplanar location anchors, the configuration 600 includes a plurality of location anchors that may or may not be coplanar. In other words, each location anchor of the plurality of location anchors is not required to be located in a single common plane. For example, the plurality of anchors 600 may be located across multiple floors of a building or on a sloping hill or mountain side. In FIG. 6, Zones 1-5 each consist of four anchors: one base anchor and three additional neighboring anchors. Zone 6 consists of three anchors: a base anchor and a two neighboring anchors.

Figure 7A:
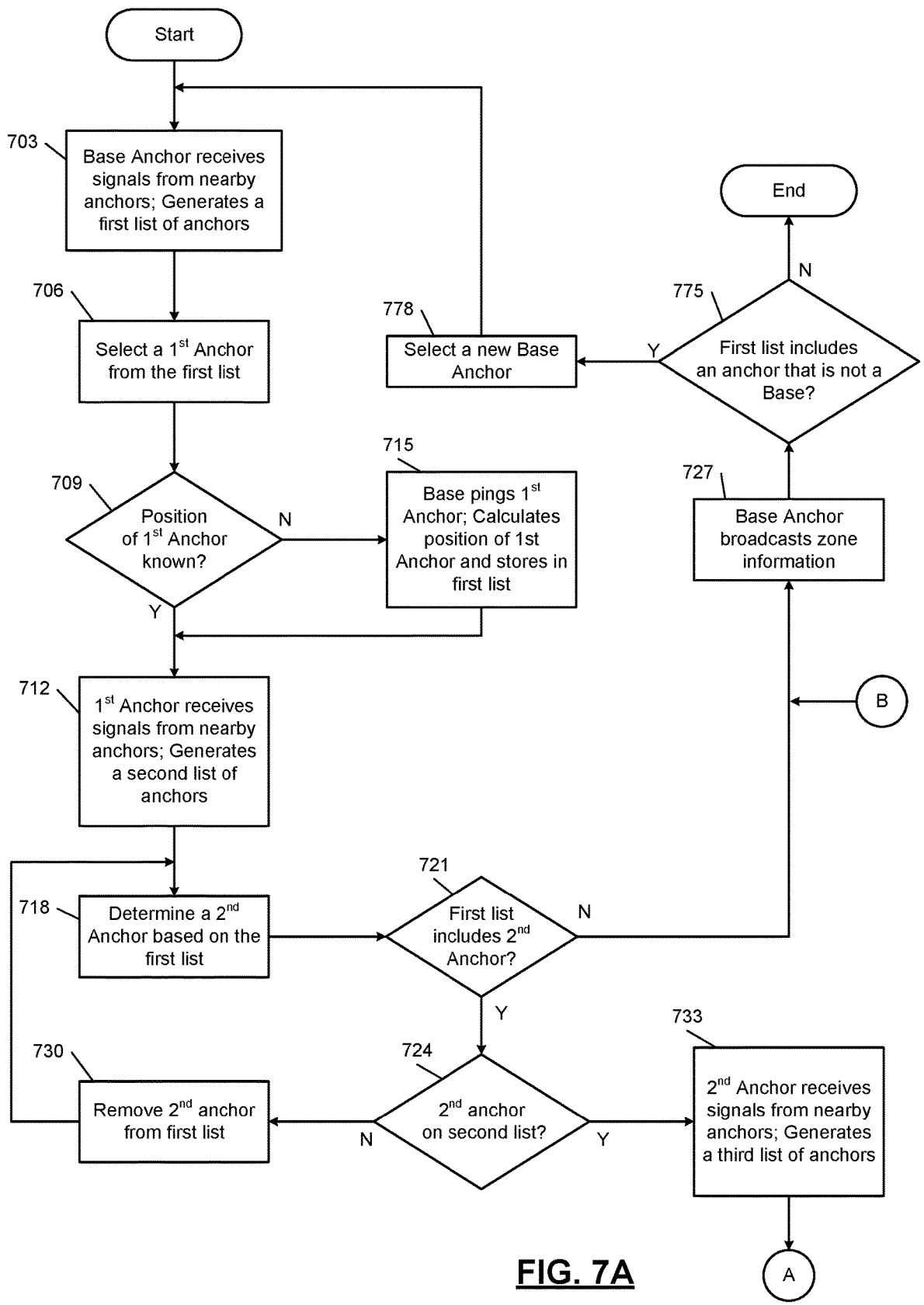
FIGS. 7A and 7B are a flowchart of example operation of auto calibration of a collection of location anchors to create zones that consist of three or more location anchors.
Figure 7B:
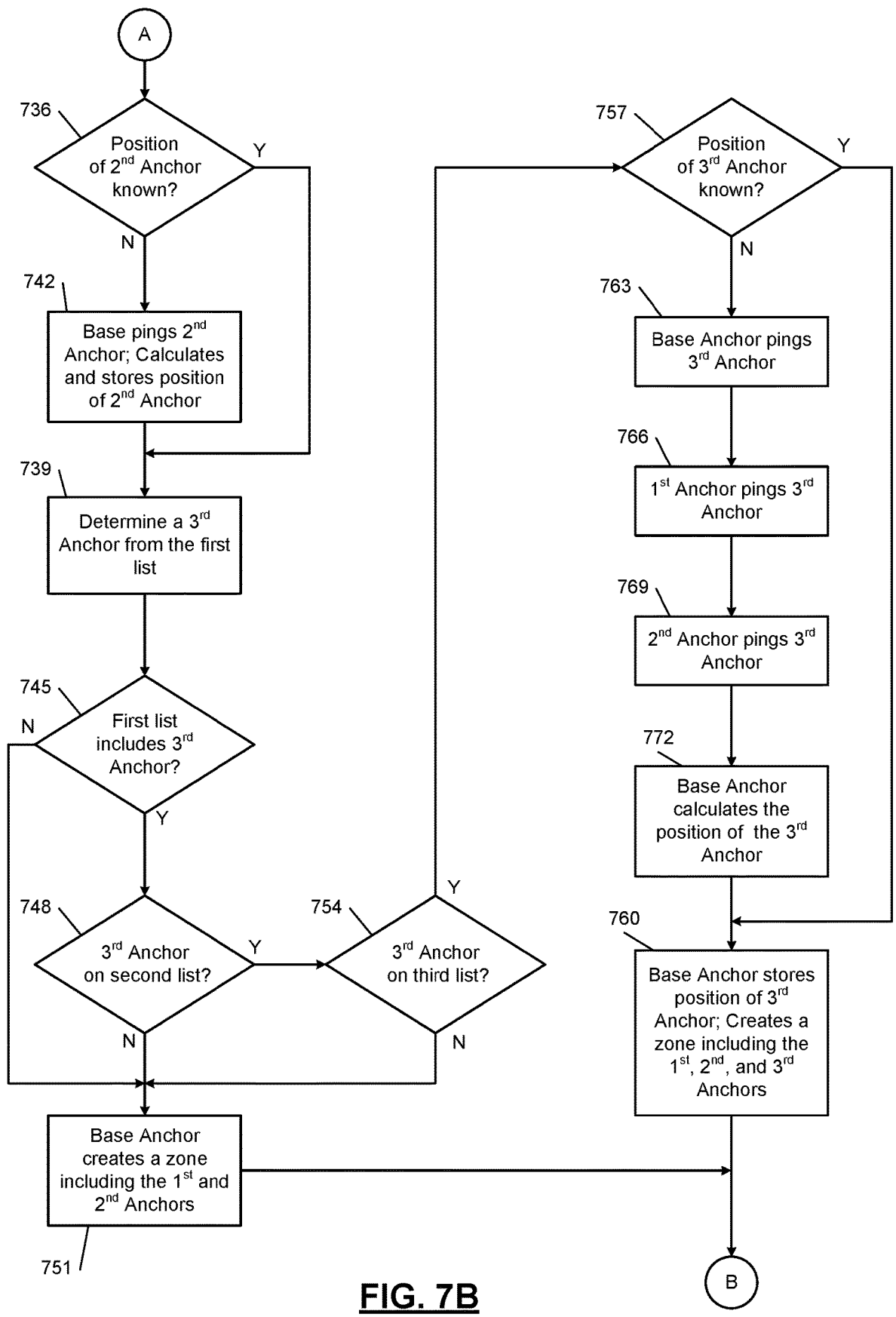

FIGS. 7A and 7B are a flowchart depicting an example method of automatically creating a plurality of zones for a plurality of location anchors, such as the plurality of location anchors in FIG. 6. As an example, the plurality of location anchors may be randomly distributed across multiple floors of a building. The process requires four parameters to be known before the location anchors can automatically create zones. The position of an initial base anchor—for example, anchor one 604—must be known. In addition, either the position or angular distance to the initial base anchor of three location anchors that neighbor the initial base anchor must be known. As previously described, the initial base and neighboring location anchors may be able to determine their respective position based on received GPS signals. Alternatively or in addition, an operator may determine the position or angular distance of the initial base and neighboring location anchors and provide the required information to each of the respective location anchors. As an example, prior to the start of the process, the position of anchor one 604 and either the position or angular distance of anchor two 608, anchor three 612, and anchor four 616 are known.

Control begins at 703 of FIG. 7A once all of the anchors have come to a rest and the above required information is obtained. At 703, the initial base anchor, for example anchor one 604, receives UWB signals from nearby location anchors such as anchor two 608, anchor three 612, and anchor four 616. The base anchor then generates a first list of location anchors that includes the ID of each location anchor that a signal is received from. In addition, the base anchor includes the position of each location anchor, if known, in the first list of location anchors. Control then progresses to 706, where the base anchor selects a first anchor from the first list of location anchors. The base anchor selects either a location anchor with a known position or a known angular distance that has the best signal as the first anchor. For example, anchor one 604 may select anchor two 608 as the first anchor. Control then continues with 709.

At 709, the base anchor determines whether the position of the selected first anchor is known. If so, control progresses to 712; otherwise, control transfers to 715. At 715, the base anchor pings the selected first anchor. In response to being pinged, the first anchor immediately replies by pinging the base anchor. The base anchor determines the length of time between pinging the selected first anchor and receiving a ping from the selected first anchor. The base anchor uses the elapsed time to determine the distance between the base anchor and the selected first anchor—for example, the distance between anchor one 604 and anchor two 608. Then the base anchor uses its position, the angular distance to the selected first anchor, and the determined distance to the selected first anchor to calculate the position of the selected first anchor. The base anchor then stores the position of the first anchor in the first list of location anchors. The base anchor may also transmit the calculated position to the first anchor. Upon receiving the calculated position, the first anchor stores the position as its current position. Control then continues with 712.

At 712, the first anchor receives UWB signals from nearby anchors and generates a second list of anchors. The first anchor includes the ID and position, if known, of each anchor that a signal is received from in the second list of anchors. For example, in response to anchor two 408 receiving an instruction from anchor one 404, anchor two 408 receives signals from anchor one 604, anchor three 612, anchor four 616, anchor five 620, and anchor six 624 and generates a list that includes these location anchors. Control then continues with 718, where the base anchor selects a second anchor from the first list of location anchors. The base anchor selects either a location anchor with a known position or a known angular distance that has the best signal, other than the selected first anchor, as the second anchor. For example, anchor one 604 selects anchor three 612 as the second anchor. At 721, if the first list of anchors includes an anchor that the base anchor is able to select as the second anchor, control progresses to 724; otherwise, control transfers to 727, as described farther below.

At 724, the base anchor determines if the selected second anchor is included in the second list. In other words, the base anchor determines if the first anchor is able to receive UWB signals transmitted by the selected second anchor. For example, anchor one 604 may query anchor two 608 with the ID of anchor three 612 and anchor two 608 responds by indicating if the second list includes the ID of anchor three 612. If the second list includes the selected second anchor, control progresses to 730; otherwise, control transfers to 733. At 730, the base anchor removes the selected second anchor from the first list and control returns to 718.

At 730, the selected second anchor receives UWB signals from nearby anchors and generates a second list of anchors. The selected second anchor includes the ID, and position if known, of each anchor that a signal is received from in the second list of anchors. For example, in response to determining that anchor three 612 is on the second list of anchors, anchor one 604 transmits an instruction to anchor three 612 to generate a list of nearby anchors. In response, anchor three 612 receives signals from nearby anchors, including anchor one 604, anchor two 608, anchor four 616, anchor five 620, and anchor ten 640, and generates a list that includes these location anchors. Control then continues with 736 of FIG. 7B.

At 736 of FIG. 7B, the base anchor determines whether the position of the selected second anchor is known. If so, control progresses to 739; otherwise control transfers to 742. At 742, the base anchor determines the distance between the base anchor and the selected second anchor by pinging the second anchor, as previously described. Then the base anchor uses its position, the angular distance to the selected first anchor, and the determined distance between the base anchor and the selected second anchor to calculate the position of the selected second anchor. The base anchor then stores the position of the selected second anchor in the first list of anchors. The base anchor may also transmit the calculated position to the selected second anchor. Upon receiving the calculated position, the selected second anchor stores the position as its current position. Control then continues with 739.

At 739, the base anchor selects a third anchor from the first list of location anchors. The base anchor selects the location anchor with the best signal, other than the first or second anchor, as the third anchor. For example, anchor one 604 selects anchor four 616 as the third anchor. Control continues with 745. At 745, if the first list of anchors includes an anchor that the base anchor is able to select as the third anchor, control progresses to 748; otherwise, control transfers to 751. At 751, the base anchor creates a zone that includes the base anchor, the selected first anchor, and the selected second anchor. Control then continues with 727 of FIG. 7A, as described below.

At 748, the base anchor determines if the selected third anchor is included in the second list. In other words, the base anchor determines if the first anchor is able to receive UWB signals transmitted by the selected third anchor. For example, the base anchor queries the first anchor with the ID of the selected third anchor and the first anchor responds by indicating if the second list includes the ID of selected third anchor. If the second list includes the selected third anchor, control progresses to 754; otherwise, control transfers to 751. At 754, the base anchor determines whether the selected third anchor is included in the third list. In other words, the base anchor determines whether the second anchor is able to receive UWB signals transmitted by the selected third anchor. If so, control progresses to 757; otherwise, control transfers to 751.

At 757, the base anchor determines whether the position of the selected third anchor is known. If so, control progresses to 760; otherwise control transfers to 763. At 763, the base anchor pings the selected third anchor and receives a ping from the selected third anchor in response. Based on the time between pings, the base anchor calculates the distance between the base anchor and the selected third anchor. Control then continues with 766. At 766, the first anchor pings the selected third anchor and calculates the distance between the first anchor and the selected third anchor. The first anchor then transmits the calculated distance to the base anchor. Control then continues with 769. At 769, the second anchor pings the selected third anchor and calculates the distance between the second anchor and the selected third anchor. The selected second anchor then transmits the calculated distance to the base anchor. Control then continues with 772.

At 772, the base anchor calculates the position of the selected third anchor based on the calculated and received distances—for example, using trilateration. Based on the three determined distances, the base anchor may determine two possible positions of the third anchor. To determine which position of the two possible positions is the correct position, the base anchor may instruct a nearby anchor with a known position, other than the first or second anchor, to ping the third anchor, determine the distance to the third anchor, and transmit the distance to the base anchor. The base anchor uses the known position of the nearby anchor and the received distance to determine which of the two possible positions is the correct position of the third anchor. The base anchor may use zone information broadcast by neighboring base anchors to select the nearby anchor. Alternatively, if the angular distance of the third anchor is known, control may progresses directly from 763 to 772, where the base anchor determines the position of the third anchor based on the distance between the base anchor and the third anchor and the angular distance of the third anchor. Control then continues with 760.

At 760, the base anchor stores the position of the third anchor in the first list of anchor. The base anchor may also transmit the calculated position to the third anchor. The base anchor then creates a zone that includes the base anchor, the selected first anchor, the selected second anchor, and the selected third anchor. For example, anchor one 604 creates Zone 1 that includes anchor one 604, anchor two 608, anchor three 612, and anchor four 616. Anchor one 604 is the base anchor of Zone 1. Control continues with 727 of FIG. 7A.

At 727 of FIG. 7A, the base anchor begins broadcasting information about the created zone. The broadcast may include the ID of the base anchor of the zone, the ID of each of the other anchors in the zone, and the position of each anchor in the zone. Control then continues with 775.

At 775, the base anchor determines whether the first list of location anchors includes a location anchor that is not a base anchor. If so control progresses to 778; otherwise control ends. At 778, the current base anchor selects an anchor from the first list of anchors to be a base anchor of a new zone. In various implementations, the base anchor gives priority to the first anchor, the second anchor, and the third anchor. If the first, second, and third anchors are already base anchors, the current base anchor selects another location anchor in the first list that has a known position as the new base anchor. In other implementations, the base anchors give priority to location anchors that receive signals from the highest number of neighboring location anchors. Control then returns to 703 where the new base anchor repeats the process to create a new zone. The process continues and new zones are created until a new base anchor is not able to be selected. Although the above process has been described with respect to a plurality of location anchors without any preexisting zones, the process may also be used to add new location anchors and zones to a plurality of location anchors with existing zones.

Figure 8:
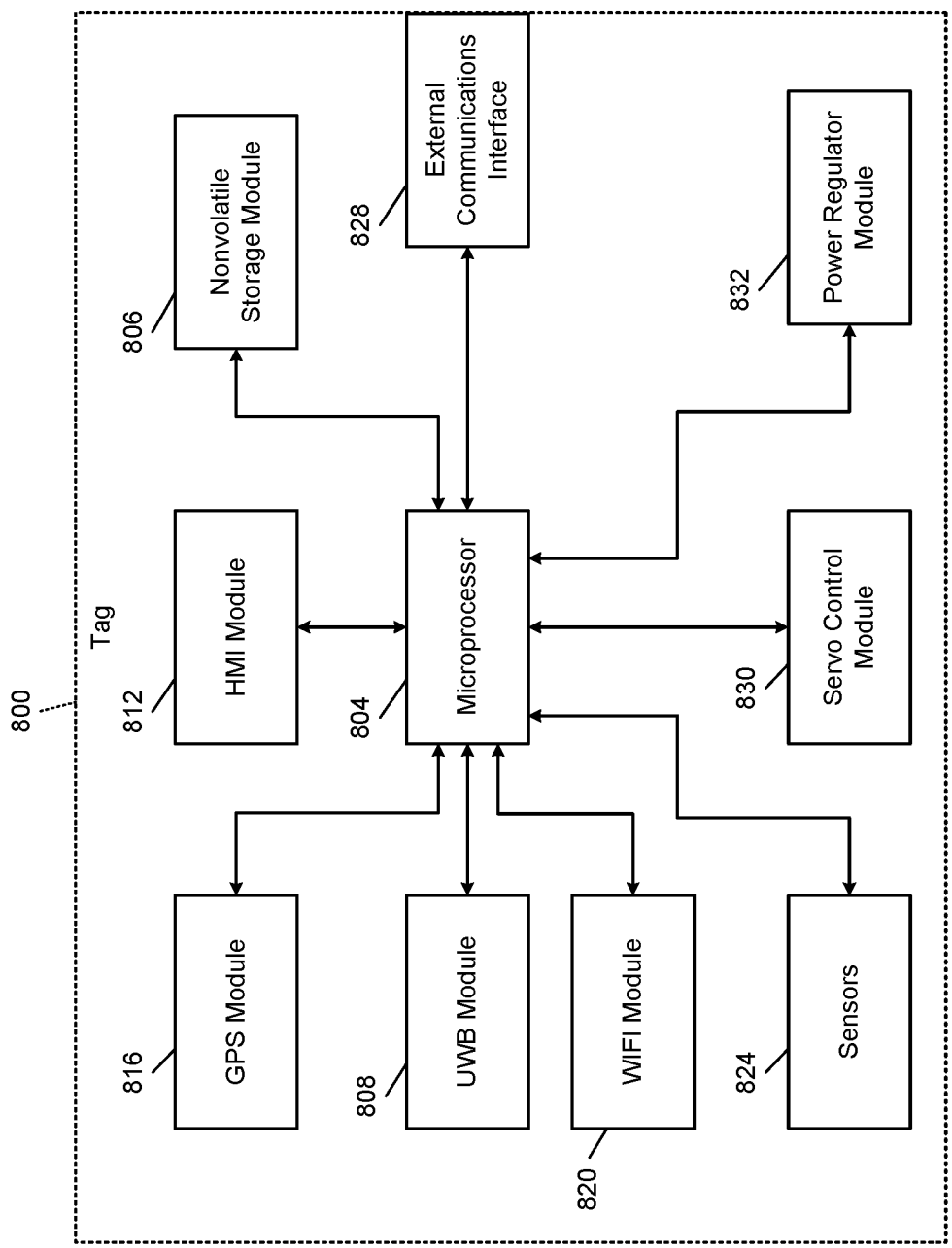
FIG. 8 is a block diagram of an example location tag that uses UWB signals to determine a current position.

FIG. 8 is a high level block diagram of an example location tag, tag 800. Tag 800 may be used with location anchors, such as the anchor 300, to determine a current position. The architecture of the tag 800 is similar to the architecture of the anchor 300. Elements of the tag 800 that are shared with the anchor 300 may be implemented in a similar way. In various implementations, the tag 800 includes all of the optional elements of the anchor 300. In other implementations, the tag 800 may perform the functions of the anchor 300. Similarly, the anchor 300 may perform the functions of the tag 800.

The tag 800 includes a microprocessor 804. The microprocessor 804 includes a processor and associated memory that stores instruction executable by the processor. In addition, the tag 800 includes a nonvolatile storage module 806. In some implementations, the nonvolatile storage module may be a secure digital ("SD") card, such as a micro SD card. The tag 800 also includes an UWB module 808. The UWB module 808 may be similar to the UWB module 308 of the anchor 300. The UWB module 808 is configured to receive information transmitted from a location anchor, such as anchor 300. For example, the UWB module 808 is configured to receive zone information broadcast by a base anchor. In some implementations, the UWB module 808 is also configured to transmit information. For example, UWB module 800 may transmit information to a location anchor or to other location tags. The tag 800 also includes an HMI module 812. Similar to the HMI module 312 of the anchor 300, the HMI module 812 provides basic input and output functions. For example, the HMI module 812 may include LEDs to present visual information to an operator. In addition, the HMI module 812 may include buttons and/or switches. The operator may use the buttons and/or switches to input information into the tag 800.

The tag 800 also includes a GPS module 816. The GPS module is configured to receive GPS signals—for example, from GPS satellites. The tag 800 may use the received GPS signals to determine the location of the tag 800. The GPS module 816 may calculate the position of the tag 800 based on the received GPS and provide the calculated position to the microprocessor 804. Alternatively, the GPS module 816 may provide the data included in the received signals to the microprocessor 804 and the microprocessor 804 determines the position based on the provided data. The GPS module 816 may include an antenna configured to receive the GPS signals. Alternatively or in addition, the GPS module may use an antenna external to the tag 800 to receive the signals.

The tag 800 may also include a WIFI module 820 configured to provide WIFI communications. For example, the tag 800 may use the WIFI module 820 to communicate with other location tags, location anchors, or other WIFI enable devices. In addition, the anchor may include one or more sensors collectively referred to as sensors 824. The sensors 824 may include an IMU that includes at least one of an accelerometer, a gyroscope, and a magnetometer. In various implementations, the sensors 824 may include navigation sensors such as sonar, infrared, distance, and pressure sensors. Additionally or alternatively, the sensors 824 may include environmental sensors such as temperature, humidity, and chemical sensors. Further, the sensors 824 may include one or more cameras that are configured to capture images and/or video. The nonvolatile storage module 806 may be used to store data collected from the sensors 824—pictures or video from the one or more cameras.

The tag 800 also includes an external communications interface 828 configured to provide wired connectivity to an external computing device. For example, the external communications interface 828 may be a USB interface. The tag 800 may also include a servo control module 830. The servo control module 830 is configured to provide a connection between the microprocessor 804 and navigational controls of a vehicle, such as the UAV 104. For example, via the servo control module 830, the microprocessor 804 is able to control the steering and propulsion of the UAV 104. This in turn allows the microprocessor 804 to navigate the UAV 104 based on the current position of the tag 800 without any external input—for example, instructions or controls from a human operator.

The tag 800 also includes a power regulator module 832. Similar to the power regulator module 332 of the anchor 300, the power regulator module 832 is configured to supply a steady voltage. For example, the power regulator module 832 may supply the microprocessor 804, the nonvolatile storage module 806, the UWB module 808, the HMI module 312, the GPS module 316, the WIFI module 320, and the sensors 324 with a steady voltage—such as 5 volts. The power regulator module 832 may receive power from a battery (not shown). In some implementations, the battery may be external to the tag 800. In other implementations, the tag 800 may include the battery. The power regulator module 832 is also configured to receive power via the external communications interface 828 or a power port (not shown). In some implementations, the battery may be a rechargeable battery and the power regulator module 332 may be configured to recharge to battery using the power supplied by the external communications interface 828 or the power port.

Figure 9:
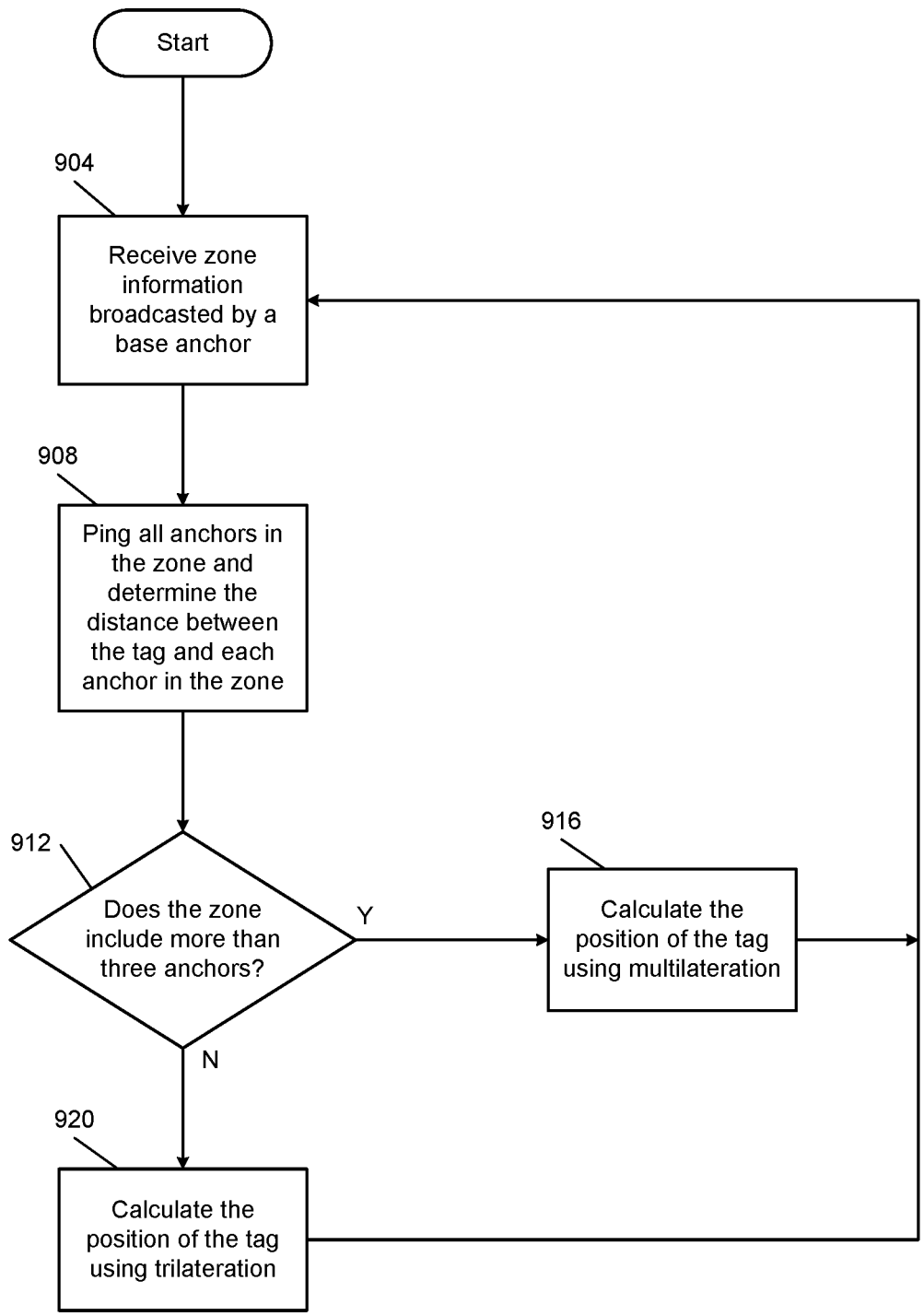
FIG. 9 is a flow chart of example operation of a location tag determining position based on a plurality of location anchors.

FIG. 9 is flowchart depicting of an example method of determining a current location based on UWB signals transmitted by a plurality of location anchors. In FIG. 9, control may be performed by the tag 800 or another location tag that is able to receive UWB signals.

Control starts at 904, where the tag 800 receives zone information that is broadcasted by a base anchor. The zone information includes the ID and position of each location anchor in the zone. Control continues with 908, where the tag pings each anchor identified in the zone information. In response to the tag 800 pinging a location anchor, the location anchor immediately pings the tag 800. The tag 800 determines the length of time between pinging the location anchor and receiving a ping from the location anchor. The tag 800 uses the elapsed time to determine the distance between the tag 800 and the location anchor. For example, the tag 800 may ping the base anchor of the zone and determines the length of time until the tag 800 receives a ping from the base anchor. The tag 800 then uses the determined time to calculate the distance between the tag 800 and the base anchor. Once the tag 800 has calculated the distance between the tag 800 and each location anchor included in the zone information, control continues with 912.

At 912, the tag 800 determines whether the zone includes more than three location anchors. If so, control progress to 916; otherwise control transfers to 920. At 920, the tag 800 calculates its current position based on the positions of the location anchors that make of the zone and the determined distances using trilateration. For example, the tag 800 may calculate the current position using equations 1 and 2 below.

$$x_t = \frac{(d_0^2 - d_1^2 + x_1^2)}{2x_1} \qquad (1)$$

$$y_t = \frac{(d_0^2 - d_2^2 + x_2^2 + y_2^2 - 2x_2 x_t)}{2y_2} \qquad (2)$$

In equations 1 and 2, $x_t$ and $y_t$ are the horizontal and vertical components, respectively, of the current position of the tag 800. In addition, $d_0$, $d_1$, and $d_2$ are the determined distances between the tag 800 and the three locations anchors that make up the zone. Further, $x_1$ is the horizontal component of the position of the anchor that is the distance d1 away from the tag 800. Similarly, $x_2$ and $y_2$ are the horizontal and vertical components, respectively, of the position of the location anchor that is the distance $d_2$ away from the tag 800. Control then returns to 904.

At 916, the tag 800 calculates is current position based on the positions of the location anchors that make of the zone and the determined distances using multilateration. For example, the tag 800 may calculate the current position using the probability density function 3 below.

$$\Pi_k \frac{1}{\sqrt{2\pi}\,\sigma_r} e^{-\frac{\sigma_r^{-2}}{2}(|x-p_k|-|p_0-p_k|)^2} \qquad (3)$$

The probability density function 3 above assumes that the time measurements are independent and distributed with $N(t\_k,\sigma)$. K represents the set of location anchors that make up the zone. The tag 800 transmits pings at time instant t that are received, after propagation through a medium with speed c, by the set K of location anchors. Each location anchor $k \in K$ is located at a fixed position $p_k$ and receives the ping from the tag 800, transmitted at the time t, at the time instant $t_k$. The tag 800 may use the time elapsed between pinging location anchor and receiving a ping in return to calculate the time instant $t_k$. For example, the tag 800 may use half of the elapsed time added to the time t as the value of the time instant $t_k$. Further, $p_0$ is the position of the tag 800 and $\sigma_r = c\sigma$ is the standard deviation of the range measurements $p_k = ct_k$.

Considering the set of squared distances between each location anchor of the zone and the tag 800 and the propagation time of the signal, it is possible to write a set of K equations that could be arranged into a system of equations 4 below.

$$2\mathrm{Col}_k(q_k^T S q) = \mathrm{Col}_k(q_k^T S q_k + q_k^T S q) \qquad (4)$$

In the above system of equations, $q_k = (p_{k,1} \ldots p_{k,d}\ t_k)^T$ is space-time vector. Further, the matrix S is define as:

$$S = \begin{pmatrix} 1 & \cdots & 0 \\ \vdots & \ddots & \vdots \\ 0 & \cdots & -c^2 \end{pmatrix}$$

The system of equation may be solved using the matrix inverse and the pseudo-inverse (Moore-Penrose matrix). The pseudo-inverse provides a linear least-square solution in the face of additive white Gaussian noise that disturbs the time measurement $t_k$. Control then returns to 904.

Figure 10:
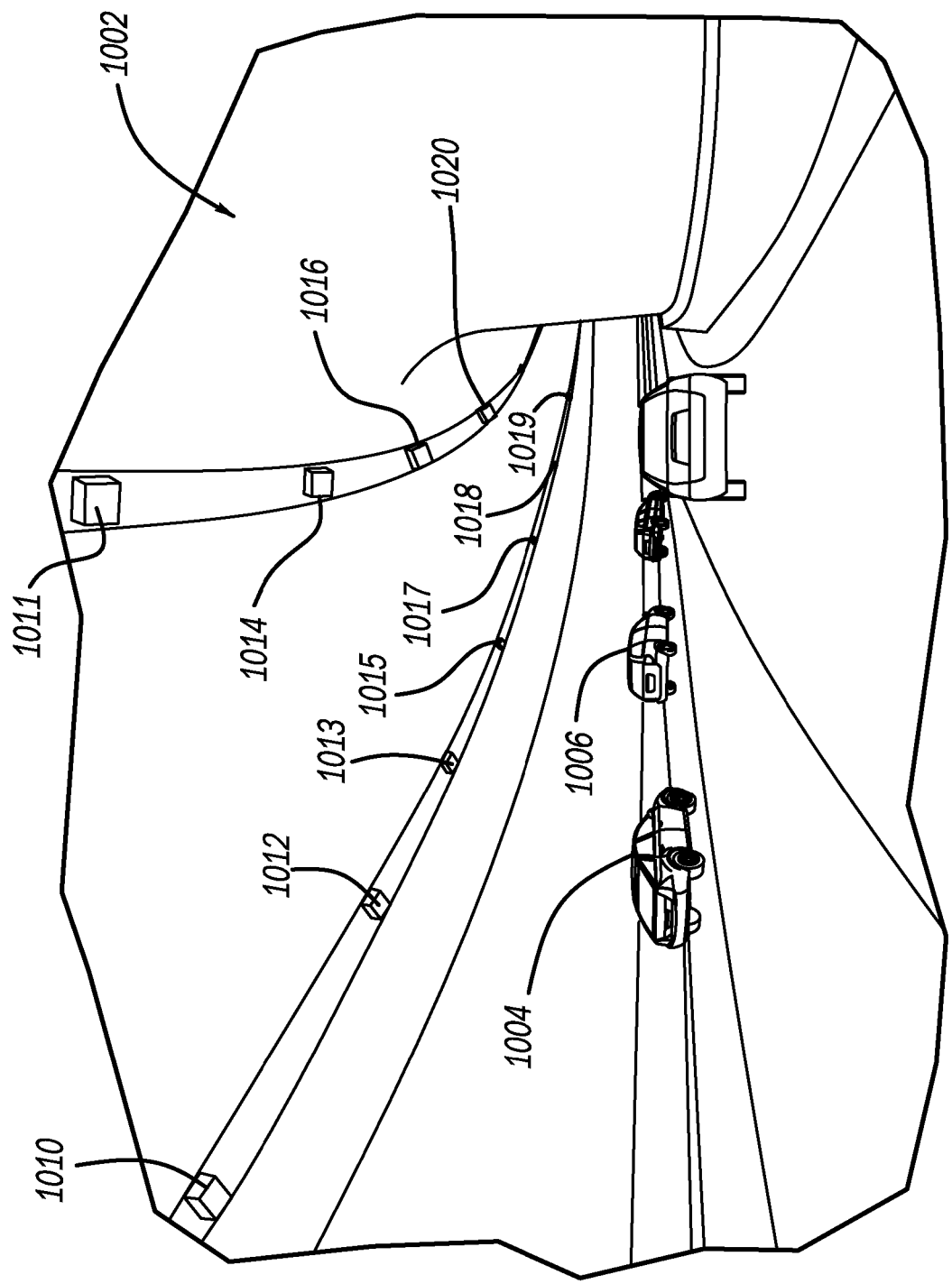
FIG. 10 is an example implementation of the disclosed positioning system in an automotive tunnel.

FIG. 10 depicts a tunnel 1002 with a plurality of vehicles traveling through the tunnel 1002. The plurality of vehicles includes a first vehicle 1004 and a second vehicle 1006. The tunnel 1002 prevents either the first vehicle 1004 or the second vehicle 1006 from receiving GPS signals. Accordingly, while traveling in the tunnel 1002, operators of the first vehicle 1004 and the second vehicle 1006 are not able to determine their respective locations using only a GPS navigation system.

The first vehicle 1004 and the second vehicle 1006 may each include a location tag, such as tag 800. The tunnel 1002 also includes a plurality of location anchors 1010-1020. Each anchor of the plurality of location anchors 1010-1020 may be a location anchor such as the anchor 300. In FIG. 10, the plurality of location anchors are affixed to the ceiling of the tunnel 1002, however, in other implementations, the anchors may be placed at different locations—such as the walls or floor of the tunnel 1002.

In various implementations, the location of each anchor may have been determined by an operator. In addition, the operator may have created a plurality of zones using the plurality of location anchors 1010-1020. In other implementations, the operator may have only placed the plurality of location anchors 1010-1020 in the tunnel and the anchors automatically determined their respective positions and created a plurality of zones. For example, the anchors may have performed the process outlined in either FIG. 5 or FIGS. 7A and 7B.

While in the tunnel 1002, the location tags of the first vehicle 1004 and the second vehicle 1006 may receive UWB signals from the plurality of location anchors 1010-1020. Each respective location tag uses the received signals to determine the location of the location tag, and therefore, the location of the associated vehicle. For example, the location tags may each perform the process described in FIG. 9 to determine their respective locations. The plurality of location anchors 1010-1020 enable the first vehicle 1004 and the second vehicle 1006 to determine an accurate current position even while the tunnel 1002 prevents reception of GPS signals from GPS satellites.

In various implementations, the location tag of the first vehicle 1004 and the location tag of the second vehicle 1006 may communicate with each other. For example, using the UWB module of each location tag. In other words, the locations tags may be configured to provide vehicle to vehicle communications. For example, the location tag of the first vehicle 1004 may transmit the current location of the first vehicle 1004 to the location tag of the second vehicle 1006. Similarly, the location tag of the second vehicle 1006 may transmit the current location of the second vehicle 1006 to the location tag of the first vehicle 1004. In this way, the first vehicle 1004 and the second vehicle 1006 each know the location of the other vehicle. The first vehicle 1004 and the second vehicle 1006, or operators thereof, may use this information to avoid a collision between the two vehicles—for example, when visibility in the tunnel 1002 is reduced.

In other implementations, a location tag, such as tag 800, may determine a position based on received GPS signals for GPS satellites, received UWB signals from nearby location anchors, or a combination of received GPS signals and received UWB signals from location anchors. Referring back to FIG. 2, the UAV 104 includes a location tag, such as the tag 800. Prior to traveling under the bridge 120, the location tag of the UAV 104 may receive GPS signals from GPS satellites, such as GPS satellites 108 and 110. As the UAV approaches the bridge, the location tag of the UAV 104 begins to receive UWB signals from the location anchors 204-216 located below the bridge 120. Once the bridge 120 prevents the GPS signals from reaching the location tag of the UAV 104, the location tag uses the received signals from the location anchors 204-216 to determine the position of the UAV 104.

Figure 11:
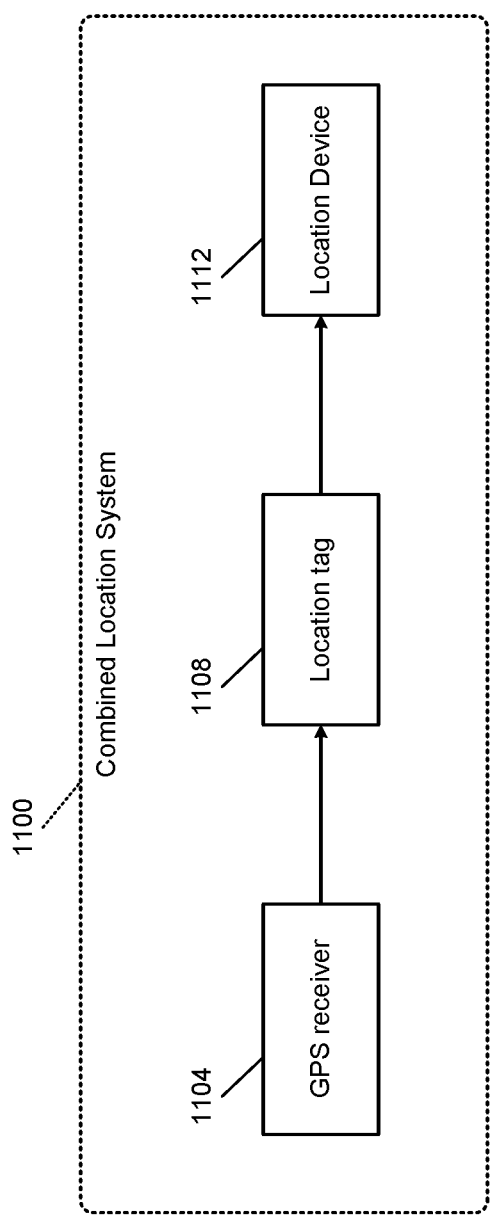
FIG. 11 is a block diagram of an example system that uses both UWB signals and GPS signals to provide location information to a location device.

In other implementations, a location tag, such tag 800, may be used with an existing GPS receiver and a location device—for example, a dash mounted navigation system in a vehicle. The navigation system may include a display, such as a screen, configured to display a current position to occupants of the vehicle. FIG. 11 depicts a high level block diagram of such an implementation. Specifically, FIG. 11 includes a combined location system 1100. The combined location system 1100 includes a GPS receiver 1104, a location tag 1108, and a location device 1112. The GPS receiver 1104 is configured to receive GPS signals and determine a current position based on the received GPS signals. The GPS receiver 1104 is further configured to output the determined position in National Marine Electronics Association ("NMEA") format. The location device 1112 is configured to display a received position. The location device 1112 is further configured to receive the position in NMEA format.

The location tag 1108 is configured to receive UWB signals form location anchors and determine a current position based on the received UWB signals. The location tag 1108 is further configured to receive the position outputted by the GPS receiver 1104 in NMEA format. The location tag 1108 may compare the position received from the GPS receiver 1104 to the position determined based on the received UWB signals. In response to either not receiving a position from the GPS receiver 1104 or the UWB based position matching the GPS based position, the location tag 1108 is configured to output the UWB based position in NMEA format. In response to the UWB position not matching the GPS based position, the location tag 1108 is configured to output the GPS based position in NMEA format. In other words, the location tag 1108 simply relays the GPS based position received from the GPS receiver in NMEA format to the location device 1112.

Figure 12:
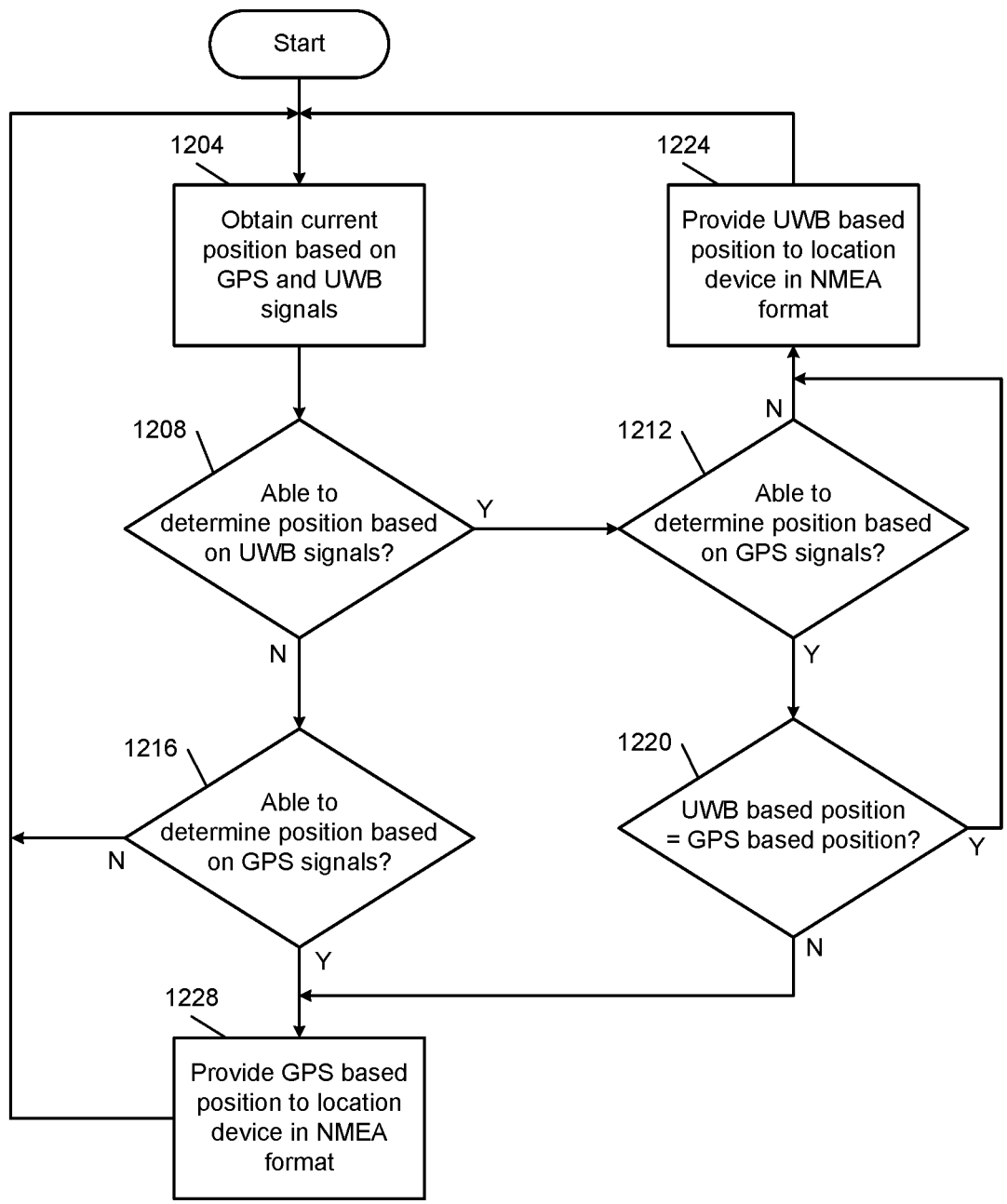
FIG. 12 is a flowchart of example operation of location device that uses a combination of UWB signals and GPS signals to determine a current position.

FIG. 12 is a flowchart depicting an example method of determining a current position based on a combination of GPS signals and UWB signals. Control may be performed by a location tag that includes both an UWB receiver and a GPS, such as the UWB module 808 and the GPS module 816 of tag 800. In other implementations, control may be performed by a location tag, such the location tag 1108 of FIG. 11, that is included a location system, such as the combined location system 1100.

Control starts with 1204, where control obtains a current position based on received GPS signals. For example, the location tag 1108 may receive a position outputted by the GPS receiver 1104. At 1204, control also obtains a current position based on received UWB signals—for example, from a plurality of location anchors in a zone. Control then continues with 1208. At 1208, control determines whether the current position is able to be determined based on received UWB signals. If so, control progresses to 1212; otherwise, control transfers to 1216.

At 1212, control determines whether the current position is able to be determined based on received GPS signals. If so, control progresses to 1220; otherwise, control transfers to 1224. At 1224, control outputs the current position based on the received UWB signals in NMEA format. For example, the location tag 1108 may output the position based on the UWB signals to the location device 1112.

At 1220, control compares the position based on the received UWB signals to the current position based on the received GPS signals. For example, the location tag 1108 may compare a position determined based on a plurality of location anchors in a zone with a position received from the GPS receiver 1104. If the UWB based position matches the GPS based position, control progresses to 1224; otherwise control transfers to 1228, as described below.

At 1216, control determines whether the current position is able to be determined based on received GPS signals. If so, control progresses to 1228; otherwise, control determines that the current position was not able to be determined based on either UWB signals or GPS signals and control returns 1204. For example, the combined location system 1100 may be unable to receive the required UWB or GPS signals. In other words, the location tag 1108 does not output a position to the location device 1112 and continues to attempt to determine the current position. At 1228, control outputs the current position based on the received GPS signals in NMEA format. For example, the location tag 1108 outputs the position received from the GPS receiver 1104 to the location device 1112.

Alternatively, location anchors configured to transmit GPS signals may be used to supplement or replace GPS signals transmitted by GPS satellites. GPS satellites transmit GPS signals at 10532 Megahertz at a constant rate. The transmitted signals contain data packets used by GPS receivers to determine a current position. The data packets include the date and time that each packet was transmitted, as well as the GPS satellite's ephemeris data—the position and orbit of the satellite. Based on the time difference between when the packet was transmitted and when the packet was received, the GPS receiver is able to determine the distance between the satellite that transmitted the packet and the GPS receiver. Once the GPS receiver receives a GPS signal from at least three different GPS satellites, the GPS receiver uses the determined distances between the GPS satellites and the GPS receiver and the positions of the GPS satellites to calculate the current position of the GPS receiver. For example, the GPS receiver may use the trilateration or a multilateration as previously discussed to calculate the current position.

Location anchors may be configured to transmit GPS signals at 10532 Megahertz to supplement or replace GPS signals transmitted by GPS satellites. As an example, the GPS module 316 of the anchor 300 may include a transmitter configured to broadcast signals at 10532 Megahertz. The anchor 300 uses the GPS module 316 to transmit data packets to nearby GPS receivers. Each data packet includes the current date and time. The data packet also includes the ephemeris data of the anchor 300. Since the anchor 300 is terrestrial based—located on the Earth—the included ephemeris data will be the position of the anchor 300 and the Earth's orbit. In various implementations, the anchor 300 may obtain its location based on received GPS signals. In other implementations, the anchor 300 may be one of a plurality of location anchors that use the previously described processes to automatically determine the position of each location anchor while creating a plurality of zones. In some implementations, the position of the anchor 300 may be determined by an operator and provided to the anchor 300.

When location anchors are used to transmit GPS signals, a GPS receiver may receive GPS signals from GPS satellites, GPS signals from location anchors transmitting GPS signals, or signals from a combination of GPS satellites and location anchors transmitting GPS signals. For example, when a GPS receiver is only able to receive signals from one or two GPS satellites, location anchors transmitting GPS signals may provide the necessary additional GPS signals to enable the GPS receiver to determine a current position. Alternatively, the GPS receiver may use the GPS signals received from location anchors to improve the accuracy of a determined current position based on GPS signals from GPS satellites. In areas where the GPS receiver is not able to receive any GPS signals from GPS satellites—for example, in the tunnel 1002—a plurality of location anchors—for example, location anchors 1010-1020—transmitting GPS signals may provide all of the GPS signals required by the GPS receiver to determine a current location. In other words, a standard GPS receiver may be able to determine a current position without receiving signals for GPS satellites.

Figure 1:
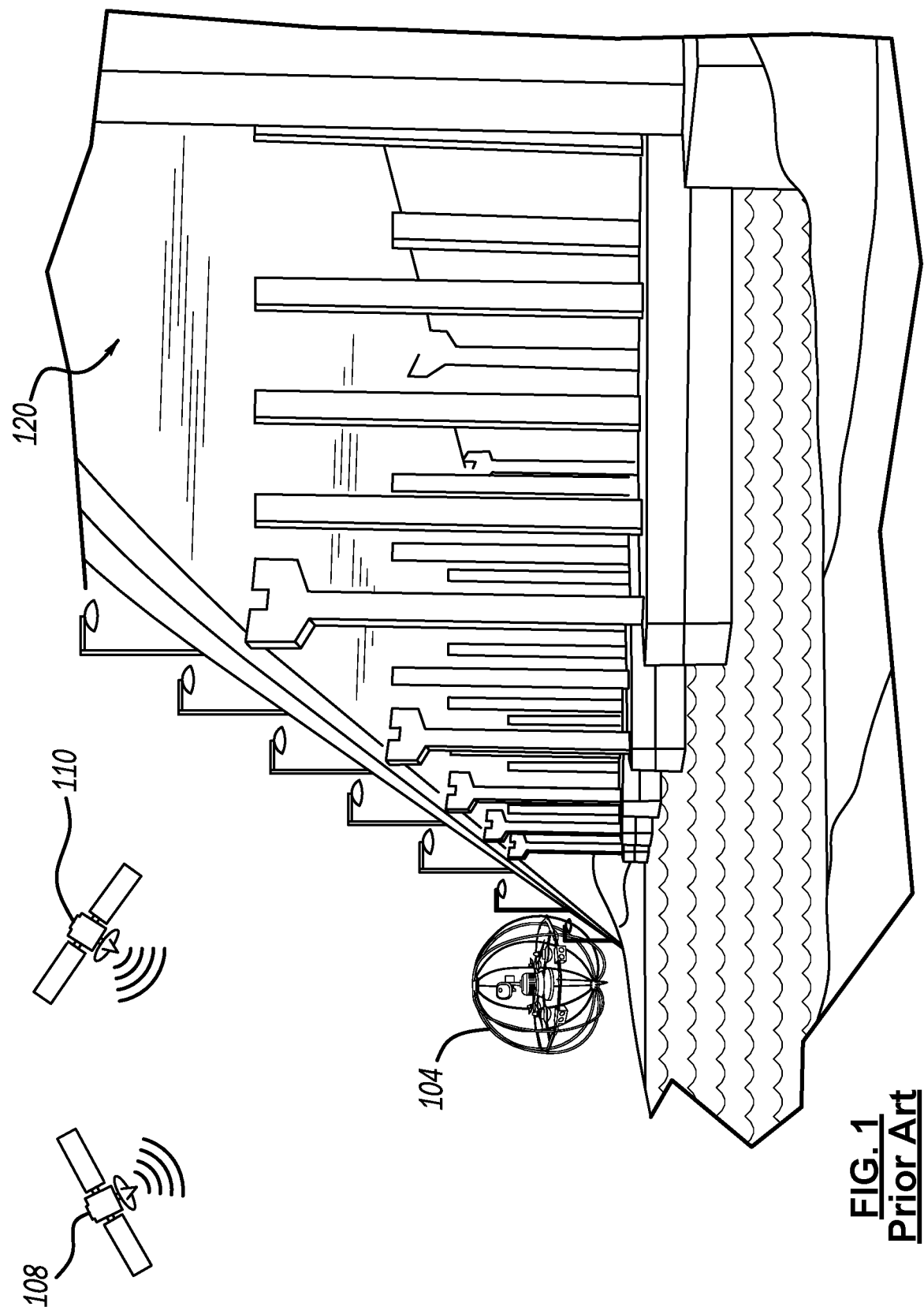
FIG. 1 depicts an unmanned aerial vehicle ("UAV") using satellite based global positioning system ("GPS") signals to navigate.
Figure 13:
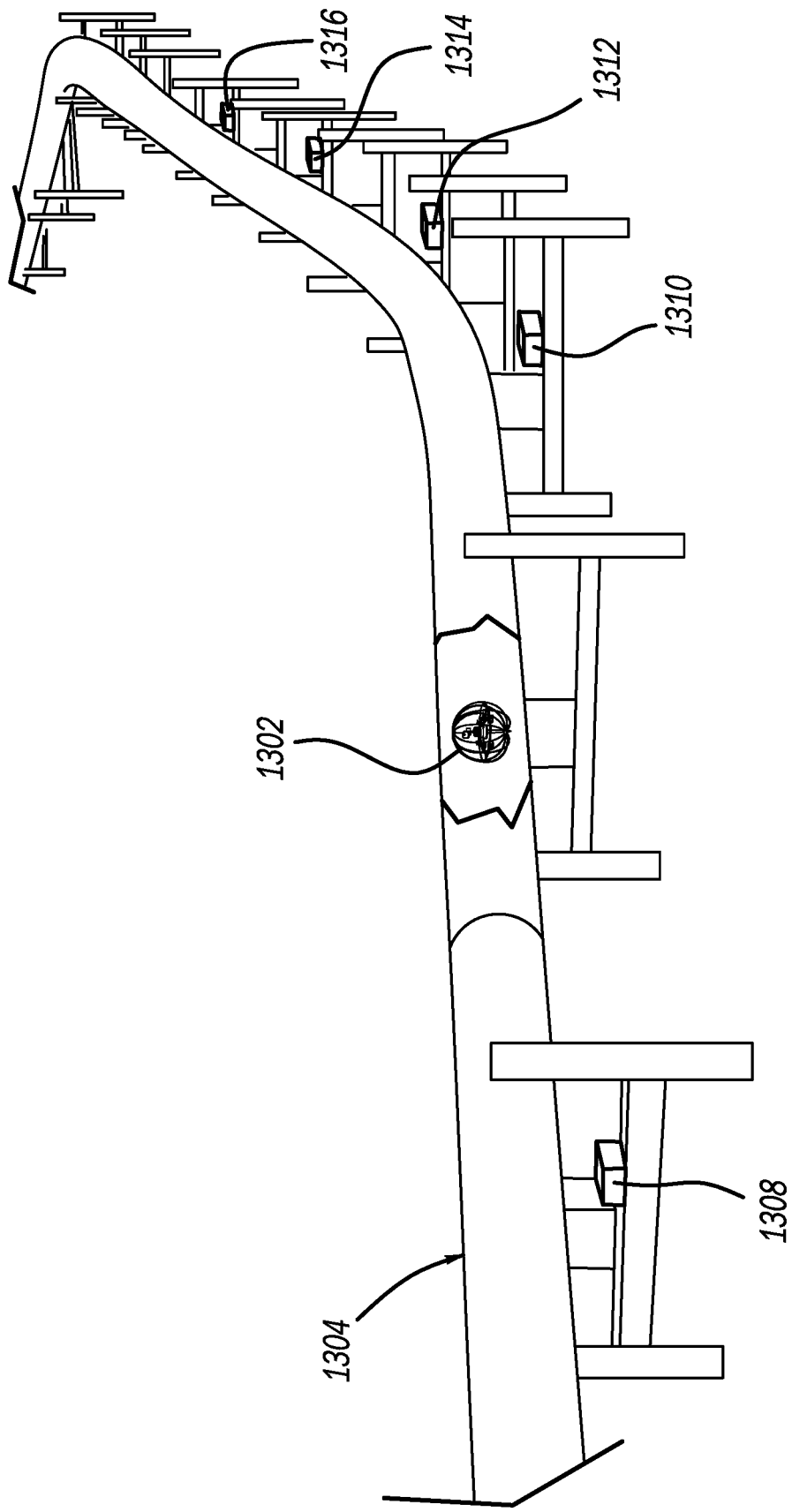
FIG. 13 depicts an example system that provides positioning and data relay services to a UAV in a confined location.

FIG. 13 illustrates an additional application of the principals of the present disclosure. FIG. 13 shows a vehicle 1302 traveling in a pipeline 1304. As depicted, the vehicle 1302, is an aerial drone similar to the UAV 104 of FIGS. 1 and 2. In other implementations, the vehicle 1302 may be a wheeled or tracked vehicle. The pipeline 1304 is an oil pipeline. In other implementations, the pipeline 1304 may be a large diameter water pipe, a sewer pipe, gas pipeline, or other confined space. The vehicle may be used to inspect the pipeline 1304 from the inside. While the vehicle 1302 is located inside of the pipeline 1304, the vehicle 1302 may not be able to receive signals from GPS satellites. In other words, the vehicle 1302 is not able to determine its position using GPS signals. A plurality of location anchors 1308-1316 are located along the pipeline. Each anchor of the plurality of location anchors 1308-1316 is placed a predetermined distance from each neighboring location anchor. The predetermined distance is based on the transmission radius of the UWB transmitter, for example the UWB module 308, in each location anchor. In other words, each location anchor of the plurality of location anchors is able to receive UWB signals from and transmit UWB signals to neighboring location anchors. For example, location anchor 1310 is able to transmit and receive UWB signals to both location anchor 1308 and location anchor 1310.

Since the position of the vehicle is limited by the pipeline 1304, the location tag of the vehicle 1302 only needs to receive a signal from two location anchors to accurately determine its current position. In other words, the plurality of anchors are used to create zones of only two anchors. For example, when the vehicle 1302 is located between the location anchor 1308 and the location anchor 1310, the location tag of the vehicle 1302 may calculate a current position by determining the distance to the location anchor 1308 and the distance to the location anchor 1310. Using the two determined distances, the location tag of the vehicle 1302 is able to calculate up to two potential positions. However, only one of the positions will be within the pipeline. Therefore, the location tag of the vehicle 1302 is able to accurately determine its current position by only receiving UWB signals from two location anchors.

The location tag of the vehicle 1302 may transmit sensor data—such as telemetry data, environmental data, and images/video—to an operator's terminal (not shown) using UWB signals. The plurality of location anchors 1308-1316 may be used to relay the data transmitted from the location tag of the vehicle 1302. When the vehicle 1302 travels a distance away from an operator's terminal that is greater than the transmission radius of the UWB module 808 of the location tag, the operator's terminal is not able to receive the UWB signals transmitted by the location tag of the vehicle 1302. In other words, the vehicle 1302 has traveled so that the operator's terminal is out of range. Since each location anchor of the plurality of anchors 1308-1316 is able to both receive and transmit UWB signals, the anchors may be used to relay the data to the operator's terminal.

In an example implementation, the location tag of the vehicle 1302 transmits data to the operator's terminal using a 1024 bit packet. In the example data package, the first 32 bits contain an address header of the packet. The address header is used to uniquely identify the packet and is used to route the packet to its intended destination. The next 672 bits of the data packet contain sensor data—for example, images and video. The following 304 bits of the data packet contain telemetry data—such as the current speed and position of the vehicle 1302. The last 16 bits of the data packet contain a checksum of the data packet. In various implementations, the location tag of the vehicle 1302 transmits data to the operator's terminal using data packets that are larger than 1024 bits.

Location tags, such as tag 800, may be used to track objects using the principals of the present disclosure. For example, tag 800 may be used to track packages during delivery, machinery located within a building, or livestock. Since the tag 800 may use both UWB signals and GPS signals to determine a current position, the position of an object with a location tag may be determined even when the object is not able to receive GPS signals. Such use of location tags provides a low cost, high accuracy tracking solution.

A plurality of location anchors may be used to monitor the movement of one or more objects that the location anchors are attached to. For example, the plurality of location anchors may be distributed across the side of a cliff face. As another example, the plurality of location anchors may be placed inside or on an unsound structure, such as a damaged building. One of the methods of automatic position determination and zone creation described above may be used to determine the position of each location anchor of the plurality of location anchors. The position of each location anchor may then be stored. For example, the zone information broadcast by each base anchor of the plurality of location anchors may be received and the ID and position of each anchor may be stored. After a period of time has elapsed, the method of automatic position determination and zone creation may be repeated. The newly determined position of each location anchor may then be compared to the corresponding stored position to determine whether the position of one or more location anchors has changed. Such a change may indicate that the one or more objects, such as the cliff face or building, is unstable. The process may be periodically repeated to determine further movement.

Presently, the technology in vehicle positioning systems is based on GPS or Differential GPS. However, many areas are not covered by GPS signals—for example, tunnels, indoor parking structures, and canyons. In others areas, GPS measurements, and the resulting determined positions, may be degraded by the presence of sky buildings (e.g., skyscrapers) or other structures. In this case, an alternative positioning system is needed for vehicle positioning.

The principals of the present disclosure provide a real-time location system (RTLS) based on UWB signals. The RTLS may be used to provide supplementary communication and positioning to autonomous vehicles. The system includes a plurality of units (e.g., location anchors and location tags) that calculate and provide the relative distances between each unit. In this way, it is possible to calculate the absolute position of a unit—for example, using triangulation, trilateration, or multilateration. In various implementations, the current position of a location tag may be determined if the absolute positions of at least three location anchors are known. In other implementations, the current position of a location tag may be determined if the absolute position of at least four anchor units in known. In addition, each unit is able to send messages and additional data to the other units.

The RTLS may be used to provide supplementary and complementary positioning to existing vehicle positioning systems—such as GPS based system—in areas where standard GPS receivers are not operative. In this way, the autonomous control of a vehicle can switch to determining its current position based on UWB signals once the vehicle enters into an area that is not covered by GPS. Further, the RTLS may be used to provide supplementary and complementary communications in existing vehicle to vehicle ("V2V") and vehicle to infrastructure ("V2I") communications systems that use dedicated short range communications ("DSRC") technology. In addition, each vehicle provided with a location tag may provide other vehicles equipped with location tags the exact measure of the distance between the vehicles—a feature that DSRC cannot provide.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A terrestrial based positioning system comprising:
a first location anchor, a second location anchor, a third location anchor and a fourth location anchor;
the first location anchor, the second location anchor, the third location anchor, and the fourth location are configured to receive and transmit ultra-wide band (UWB) signals;
the first location anchor is configured to determine a position of the second location anchor based on a first signal received from the second location anchor, determine a position of the third location anchor based on a second signal received from the third location anchor, create a first zone that includes the first location anchor, the second location anchor, and the third location anchor, and broadcast information associated with the first zone; and
the second location anchor is configured to determine a position of the fourth location anchor and create a second zone that includes the second location anchor, the third location anchor, and the fourth location anchor; and
the second location anchor is configured to broadcast information associated with the second zone.

2. The terrestrial based positioning system of claim 1 wherein:
the first location anchor, the second location anchor, and the third location anchor each have a unique identification (ID); and
the information associated with the first zone includes:
the unique ID of the first location anchor,
the unique ID of the second location anchor, and
the unique ID of the third location anchor.

3. The terrestrial based positioning system of claim 2 wherein the information associated with the first zone includes:
the position of the first location anchor;
the position of the second location anchor; and
the position of the third location anchor.

4. The terrestrial based positioning system of claim 3 further comprising a fourth location anchor having a unique ID, wherein the fourth location anchor is configured to receive and transmit UWB signals.

5. The terrestrial based positioning system of claim 4 wherein:
the first location anchor is configured to determine a position of the fourth location anchor based on a third signal received from the fourth location anchor;
the first zone includes the fourth location anchor; and
the information associated with the first zone includes (i) the position of the fourth location anchor and (ii) the unique ID of the fourth location anchor.

6. A terrestrial based positioning system comprising:
a first location anchor, a second location anchor, a third location anchor, a fourth location anchor;
the first location anchor, the second location anchor, the third location anchor, and the fourth location anchor are configured to receive and transmit ultra-wide band (UWB) signals, and each having a unique identification (ID) where the information associated with the unique ID of the first location anchor includes the unique ID of the first location anchor, the unique ID of the second location anchor, the unique ID of the third location anchor, the position of the first location anchor; the position of the second location anchor, and the position of the third location anchor, and
the first location anchor is further configured to:
determine a position of the second location anchor based on a first signal received from the second location anchor,
determine a position of the third location anchor based on a second signal received from the third location anchor,
create a first zone that includes the first location anchor, the second location anchor, and the third location anchor, and
broadcast information associated with the first zone;
wherein the second location anchor is configured to:
determine a position of the fourth location anchor;
create a second zone that includes the second location anchor, the third location anchor, and the fourth location anchor; and
broadcast information associated with the second zone, wherein the information associated with the second zone includes:
the position and unique ID of the second location anchor,
the position and unique ID of the third location anchor, and
the position and unique ID of the fourth location anchor.

7. The terrestrial based positioning system of claim 6 wherein determining the position of the fourth location anchor includes determining a distance between the first location anchor and the fourth location anchor.

8. A location device comprising:
an ultra-wide band (UWB) module configured to transmit and receive UWB signals;
a processor; and
a computer-readable medium that includes instructions executable by the processor, wherein the instructions, when executed, cause the processor to determine a current position based on a received first zone information, a received second zone information, a received first UWB signal, a received second UWB signal, a received third UWB signal and a received fourth UWB signal;
receiving first zone information from a base location anchor, wherein the first zone information includes a position of the base location anchor, a position of a first location anchor, and a position of a second location anchor;
receiving second zone information from the first location anchor, wherein the second zone information includes a position of the first location anchor, a position of the second location anchor, and a position of a third location anchor;
receiving a first UWB signal from the base location anchor;
receiving a second UWB signal from the first location anchor;
receiving a third UWB signal from the second location anchor; and
receiving a fourth UWB signal from the third location anchor.

9. The location device of claim 8 wherein:
the instructions further cause the processor to, in response to receiving the zone information, ping: (i) the base location anchor, (ii) the first location anchor, and (iii) the second location anchor;

the base location anchor transmits the first UWB signal in response to being pinged by the location device;
the first location anchor transmits the second UWB signal in response to being pinged by the location device; and
the second location anchor transmits the third UWB signal in response to being pinged by the location device.

10. The location device of claim 9 further comprising a servo control module configured to control operation of an autonomous vehicle,
wherein the instructions further cause the processor to provide commands for controlling the operation of the autonomous vehicle and (ii) the commands are based on the determined current position.

11. The location device of claim 10 wherein the autonomous vehicle is an aerial drone.

12. The location device of claim 10 wherein the autonomous vehicle is located in one of a building, a parking structure, and a tunnel.

13. A positioning system comprising:
a global position system (GPS) receiver configured to:
receive a plurality of GPS signals, and
in response to receiving the plurality of GPS signals, (i) determine a first position based on the plurality of GPS signals and (ii) output the determined first position in National Marine Electronics Association (NMEA) format; and
a location tag configured to:
receive the first position outputted by the GPS receiver,
receive a plurality of ultra-wide band (UWB) signals, and
in response to receiving the plurality of UWB signals:
determine a second position based on the plurality of UWB signals,
determine whether the first position has been received from the GPS receiver,
in response to determining that the first position has been received, comparing the first position to the second position; and
in response to the first position matching the second position, output the second position in NMEA format to a location device;
in response to determining that the first position has not been received from the GPS receiver, output the second position in NMEA format to the location device; and
in response to the first position not matching the second position, output the first position in NMEA format to the location device.

14. The positioning system of claim 13 wherein the location device is configured to display a position received in NMEA on a display screen of the location device.

15. The positioning system of claim 14 wherein the location device is a navigation system of a vehicle.

16. A system comprising:
a plurality of location anchors, wherein each location anchor of the plurality of location anchors is configured to transmit and receive ultra-wide band (UWB) signals; and
a location tag configured:
receive a first UWB signal from a first anchor of the plurality of location anchors, wherein the first anchor has a first position;
receive a second UWB signal from a second anchor of the plurality of location anchors, wherein the second anchor has a second position that is different than the first position;
determine a current position based on the first UWB signal and the second UWB signal; and
a terminal configured to receive UWB signals transmitted by the plurality of location anchors, wherein:
the location tag is further configured to transmit a third UWB signal,
the third UWB signal includes sensor data, and
each anchor of the plurality of location anchors is configured to relay the third UWB signal to the terminal.

17. The system of claim 16 wherein the sensor data includes at least one of
(i) image data, (ii) video data, and (iii) telemetry data.

18. The system of claim 16 wherein the sensor data includes data from an autonomous vehicle located in a confined space and wherein each location anchor of the plurality of location anchors is located outside of the confined space.

19. The system of claim 16 wherein the third UWB signal is a packet that includes (i) an address header, (ii) the sensor data, and (iii) telemetry data.

20. The system of claim 16 wherein:
the plurality of location anchors includes a third anchor that has a third position,
the third position is different than the first position and the second position, and
relaying the third UWB signal includes:
in response to the first anchor receiving the third UWB signal, the first anchor broadcasts the third UWB signal,
in response to the third anchor receiving the third UWB signal broadcasted by the first anchor, the third anchor broadcasts the third UWB signal, and
the terminal receives the third UWB signal broadcasted by the third anchor.

* * * * *